(12) United States Patent
Park

(10) Patent No.: US 9,832,513 B2
(45) Date of Patent: Nov. 28, 2017

(54) DIGITAL DEVICE AND CONTROLLING METHOD THEREOF

(71) Applicant: LG ELECTRONICS INC., Seoul (KR)

(72) Inventor: Chala Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/040,312

(22) Filed: Feb. 10, 2016

(65) Prior Publication Data

US 2017/0064367 A1 Mar. 2, 2017

(30) Foreign Application Priority Data

Aug. 31, 2015 (KR) .................. 10-2015-0122449

(51) Int. Cl.
*H04N 7/173* (2011.01)
*H04N 21/422* (2011.01)
(Continued)

(52) U.S. Cl.
CPC ..... *H04N 21/4222* (2013.01); *H04N 21/4126* (2013.01); *H04N 21/4312* (2013.01);
(Continued)

(58) Field of Classification Search
CPC .......... H04N 21/4222; H04N 21/4126; H04N 21/4312; H04N 21/482; H04N 21/4333;
(Continued)

(56) References Cited

U.S. PATENT DOCUMENTS

2005/0097618 A1 5/2005 Arling et al.
2010/0262986 A1 10/2010 Adimatyam et al.
(Continued)

OTHER PUBLICATIONS

European Search Report dated Jul. 29, 2016 issued in Application No. 15003541.8.

*Primary Examiner* — John Schnurr
(74) *Attorney, Agent, or Firm* — KED & Associates LLP

(57) ABSTRACT

Disclosed are a digital device and controlling method thereof. The present invention includes a display unit, a communication unit connecting a communication with a $1^{st}$ external device, the communication unit receiving a play information of at least one content played in the $1^{st}$ external device from the $1^{st}$ external device, a memory storing the play information of the at least one content received from the $1^{st}$ external device and a controller configured to control the communication unit to connect a communication with a $2^{nd}$ external device, control the display unit to display at least one indicator corresponding to each of the at least one content on a screen based on the play information of the at least one content, and control the communication unit to transmit a control signal for playing a specific content corresponding to the $1^{st}$ indicator and a play information of the specific content to the $2^{nd}$ external device in response to a $1^{st}$ command for selecting a $1^{st}$ indicator from the at least one indicator.

8 Claims, 19 Drawing Sheets

(a)

(b)

(51) Int. Cl.
    *H04N 21/41*       (2011.01)
    *H04N 21/433*      (2011.01)
    *H04N 21/436*      (2011.01)
    *H04N 21/442*      (2011.01)
    *H04N 21/472*      (2011.01)
    *H04N 21/485*      (2011.01)
    *H04N 21/431*      (2011.01)
    *H04N 21/482*      (2011.01)

(52) U.S. Cl.
    CPC ... *H04N 21/4333* (2013.01); *H04N 21/43615* (2013.01); *H04N 21/44222* (2013.01); *H04N 21/47217* (2013.01); *H04N 21/482* (2013.01); *H04N 21/485* (2013.01)

(58) Field of Classification Search
    CPC ....... H04N 21/43615; H04N 21/44222; H04N 21/47217; H04N 21/485
    See application file for complete search history.

(56) References Cited

U.S. PATENT DOCUMENTS

| | | | |
|---|---|---|---|
| 2013/0086617 A1* | 4/2013 | McQuaide, Jr. | H04N 21/436 725/78 |
| 2014/0033238 A1* | 1/2014 | Jeon | H04N 21/44204 725/13 |
| 2014/0282749 A1* | 9/2014 | Joseph | H04N 21/25866 725/68 |
| 2015/0058409 A1 | 2/2015 | Wang | |
| 2015/0135206 A1 | 5/2015 | Reisman | |

* cited by examiner

FIG. 19
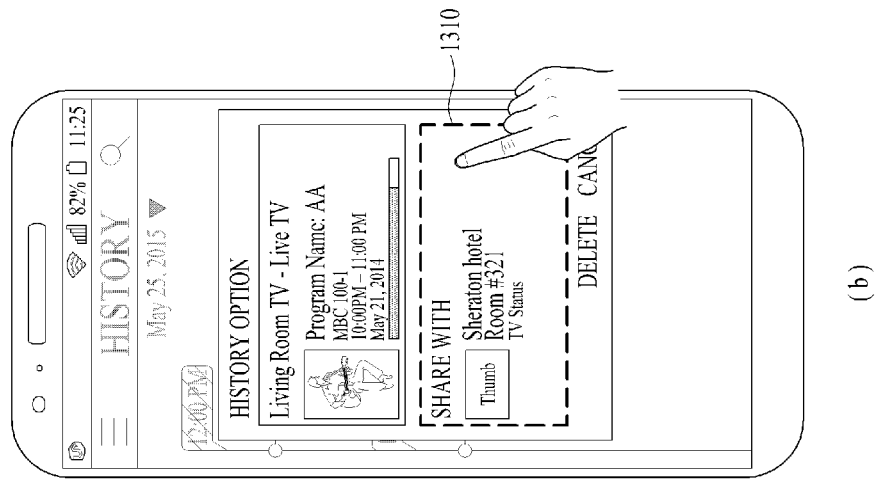
(b)
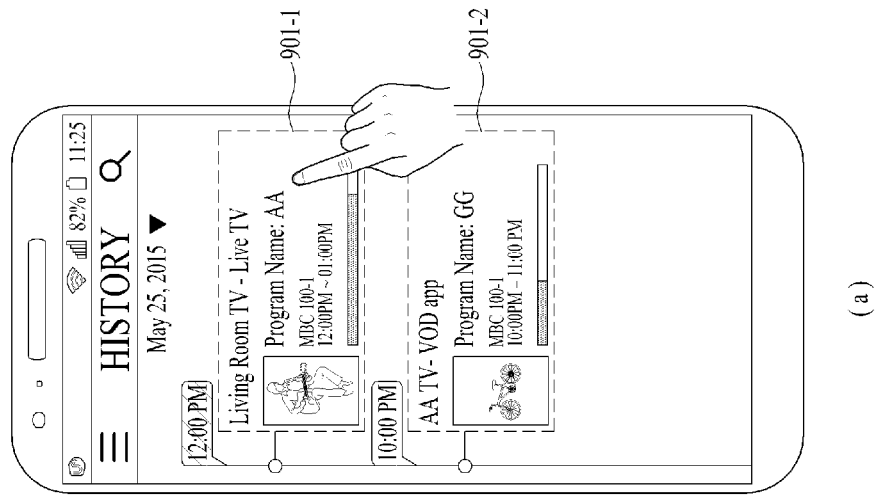
(a)

DIGITAL DEVICE AND CONTROLLING METHOD THEREOF

CROSS-REFERENCE TO RELATED APPLICATIONS

Pursuant to 35 U.S.C. §119(a), this application claims the benefit of earlier filing date and right of priority to Korean Application No. 10-2015-0122449, filed on Aug. 31, 2015, the contents of which are hereby incorporated by reference herein in their entirety.

BACKGROUND OF THE INVENTION

Field of the Invention

The present invention relates to a multimedia device and a method for controlling the same.

Discussion of the Related Art

In succession to standing device, such as PC (Personal Computer), TV (Television), and so on, the evolution of mobile devices, such as smart phones, Tablet PCs, and so on, is remarkable. Although standing devices and mobile devices have initially been evolving in each of their respective fields by being differentiated from one another, such fields have become non-distinctive with the recent advent of the digital convergence boom.

And, a stationary device such as a TV increasingly tends to be controlled using a preset application (e.g., a remote controller application, etc.) saved in a digital device (e.g., a mobile terminal, etc.).

However, after a user has watched a specific content up to a specific timing point through a $1^{st}$ TV, if the user desires to watch the specific content in continuation with the specific timing point through a $2^{nd}$ TV other than the $1^{st}$ TV through which the specific content has been watched, the user should memorize the specific timing point. And, it is inconvenient for the user to manually control the $2^{nd}$ TV to play the specific content in continuation with the specific timing point using the digital device.

Moreover, in order to change the settings of a plurality of TVs into the same, a user should memorize the setting values previously changed for a plurality of the TVs. And, the user should manually change the setting values for each of the TVs using the digital device.

SUMMARY OF THE INVENTION

Accordingly, embodiments of the present invention are directed to a digital device and controlling method thereof that substantially obviate one or more problems due to limitations and disadvantages of the related art.

One object of the present invention is to provide a digital device and controlling method thereof, by which a digital device having a communication connected to a TV is enabled to receive play information of a specific content watched through the TV and setting data for the setting values changed for the TV, to save the received information and data to a memory, and to control another TV other than the former TV using the saved setting data and the saved play information of the specific content.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a digital device according to one embodiment of the present invention may include a display unit, a communication unit connecting a communication with a $1^{st}$ external device, the communication unit receiving a play information of at least one content played in the $1^{st}$ external device from the $1^{st}$ external device, a memory storing the play information of the at least one content received from the $1^{st}$ external device, and a controller controlling the communication unit to connect a communication with a $2^{nd}$ external device, the controller controlling the display unit to display at least one indicator corresponding to each of the at least one content on a screen based on the play information of the at least one content, the controller controlling the communication unit to transmit a control signal for playing a specific content corresponding to the $1^{st}$ indicator and a play information of the specific content to the $2^{nd}$ external device in response to a $1^{st}$ command for selecting a $1^{st}$ indicator from the at least one indicator.

In another aspect of the present invention, as embodied and broadly described herein, a method of controlling a digital device according to another embodiment of the present invention may include the steps of connecting a communication with a $1^{st}$ external device, receiving a play information of at least one content played in the $1^{st}$ external device from the $1^{st}$ external device, saving the play information of the at least one content received from the $1^{st}$ external device, connecting a communication with a $2^{nd}$ external device, displaying at least one indicator corresponding to each of the at least one content on a screen based on the play information of the at least one content, and transmitting a control signal for playing a specific content corresponding to the $1^{st}$ indicator and a play information of the specific content to the $2^{nd}$ external device in response to a $1^{st}$ command for selecting a $1^{st}$ indicator from the at least one indicator.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

Accordingly, embodiments of the present invention provide various effects and/or features.

According to at least one of embodiments of the present invention, although a user has watched a specific content up to a specific timing point through a $1^{st}$ TV, it is advantageous in that the user can conveniently watch the specific content in continuation with the specific timing point through a $2^{nd}$ TV other than the $1^{st}$ TV.

According to at least one of embodiments of the present invention, it is advantageous in that a user does not need to memorize the setting values previously changed for the respective TVs by a user in order to change the settings of a plurality of TVs into the same. And, it is also advantageous in that the user can conveniently change the setting values for the respective TVs using a digital device.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings:

FIG. 19 is a diagram to describe one example of a method for a digital device to transmit a play signal for playing a specific content and a play information of the specific content to a $2^{nd}$ external device according to one embodiment of the present invention.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

In the following description, various embodiments according to the present invention are explained with reference to attached drawings.

Figure 1:
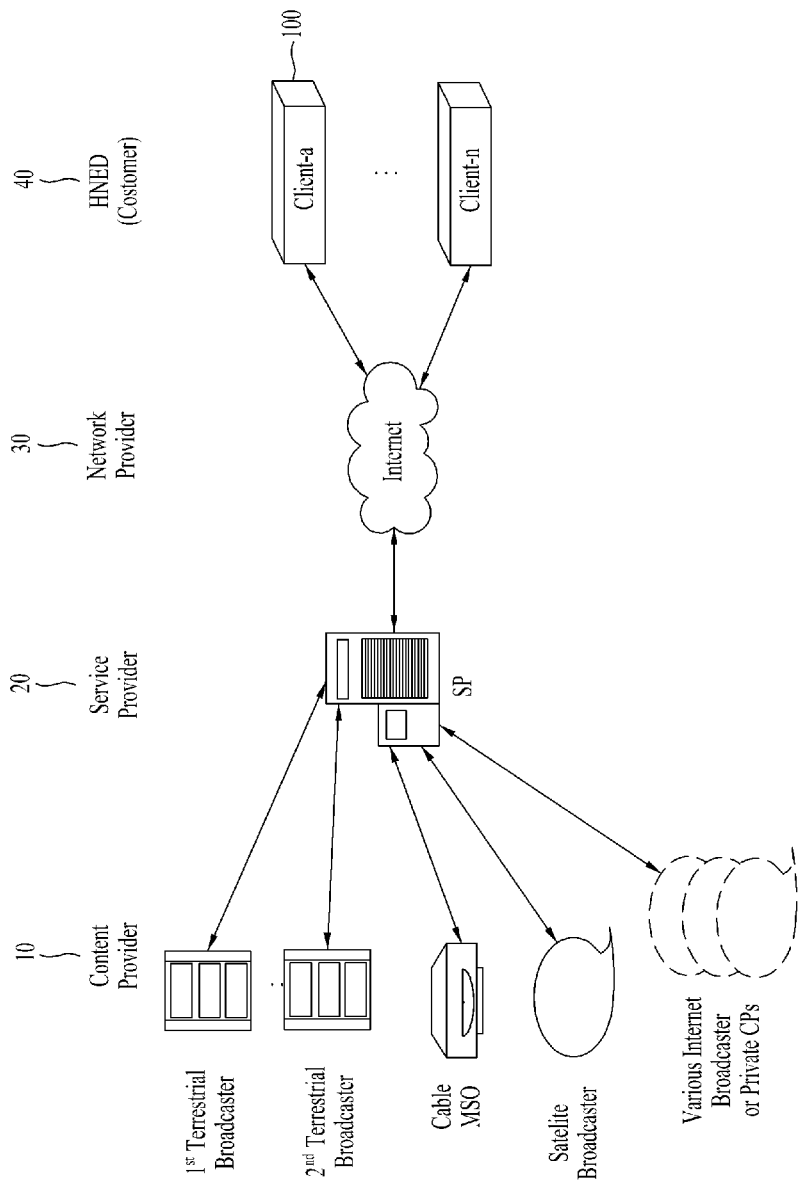
FIG. 1 is a schematic diagram illustrating a service system including a digital device according to one embodiment of the present invention.

FIG. 1 illustrates a broadcast system including a digital receiver according to an embodiment of the present invention.

Referring to FIG. 1, examples of a broadcast system comprising a digital receiver may include a content provider (CP) 10, a service provider (SP) 20, a network provider (NP) 30, and a home network end user (HNED) (Customer) 40. The HNED 40 includes a client 100, that is, a digital receiver.

Each of the CP 10, SP 20 and NP 30, or a combination thereof may be referred to as a server. The HNED 40 can also function as a server. The term 'server' means an entity that transmits data to another entity in a digital broadcast environment. Considering a server-client concept, the server can be regarded as an absolute concept and a relative concept. For example, one entity can be a server in a relationship with a first entity and can be a client in a relationship with a second entity.

The CP 10 is an entity that produces content. Referring to FIG. 1, the CP 10 can include a 1st or 2nd terrestrial broadcaster, a cable system operator (SO), a multiple system operator (MSO), a satellite broadcaster, various Internet broadcasters, private content providers (CPs), etc. The content can include applications as well as broadcast content.

The SP 20 packetizes content provided by the CP 10. Referring to FIG. 1, the SP 20 packetizes content provided by the CP 10 into one or more services available for users.

The SP 20 can provide services to the client 100 in a uni-cast or multi-cast manner.

The CP 10 and the SP 20 can be configured in the form of one entity. For example, the CP 10 can function as the SP 20 by producing content and directly packetizing the produced content into services, and vice versa.

The NP 30 can provide a network environment for data exchange between the server 10 and/or 20 and the client 100. The NP 30 supports wired/wireless communication protocols and constructs environments therefor. In addition, the NP 30 can provide a cloud environment.

The client 100 can construct a home network and transmit/receive data.

The server can use and request a content protection means such as conditional access. In this case, the client 100 can use a means such as a cable card or downloadable CAS (DCAS), which corresponds to the content protection means of the server.

In addition, the client 100 can use an interactive service through a network. In this case, the client 100 can directly serve as the CP 10 and/or the SP 20 in a relationship with another client or indirectly function as a server of the other client.

Figure 2:
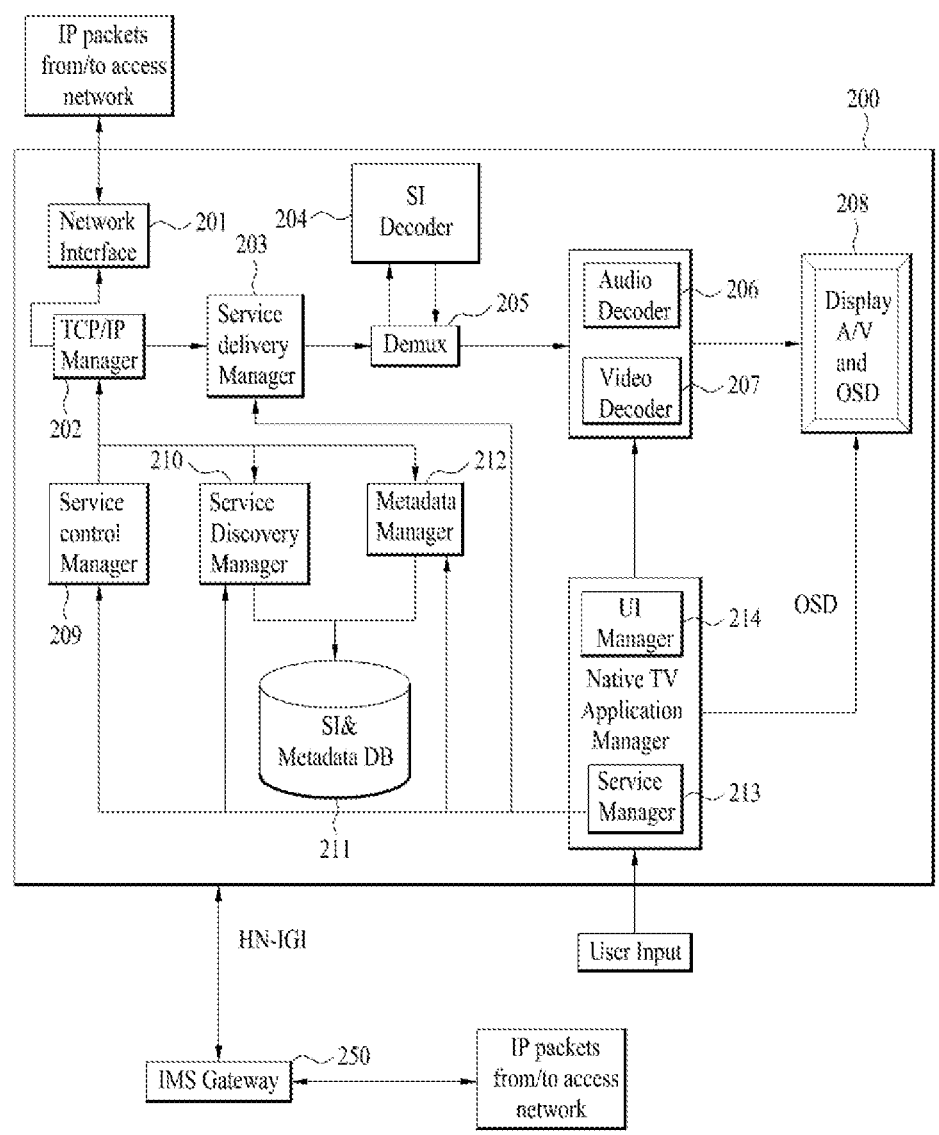
FIG. 2 is a block diagram showing a digital device according to one embodiment of the present invention.

FIG. 2 is a schematic diagram of a digital receiver 200 according to an embodiment of the present invention. The digital receiver 200 may correspond to the client 100 shown in FIG. 1.

The digital receiver 200 may include a network interface 201, a TCP/IP manager 202, a service delivery manager 203, an SI (System Information, Service Information or Signaling Information) decoder 204, a demultiplexer 205, an audio decoder 206, a video decoder 207, a display A/V and OSD (On Screen Display) module 208, a service control manager 209, a service discovery manager 210, a SI & metadata database (DB) 211, a metadata manager 212, an application manager, etc.

The network interface 201 may receive or transmit IP packets including service data through a network. In other words, the network interface 201 may receive IP packets including at least one of text data, image data, audio data, and video data, used for SNS, as well as services and applications from a server connected thereto through a network.

The TCP/IP manager 202 may involve delivery of IP packets transmitted to the digital receiver 200 and IP packets transmitted from the digital receiver 200, that is, packet delivery between a source and a destination. The TCP/IP manager 202 may classify received packets according to an appropriate protocol and output the classified packets to the service delivery manager 205, the service discovery manager 210, the service control manager 209, and the metadata manager 212.

The service delivery manager 203 may control classification and processing of service data. The service delivery manager 203 may control real-time streaming data, for example, using real-time protocol/real-time control protocol (RTP/RTCP). In other words, the service delivery manager 203 may parse a real-time streaming data packet, transmitted on the basis of the RTP, according to the RTP and transmits the parsed data packet to the demultiplexer 205 or store the parsed data packet in the SI & metadata DB 211 under the control of the service manager 213. The service delivery manager 203 can feed back network reception information to the server on the basis of the RTP.

The demultiplexer 205 may demultiplex audio data, video data, SI from a received packet through packet identifier (PID) filtering and transmit the demultiplexed data to corresponding processors, that is, the audio/video decoder 206/207 and the SI decoder 204.

The SI decoder 204 may parse and/or decode SI data such as program specific information (PSI), program and system information protocol (PSIP), digital video broadcast-service information (DVB-SI), etc.

The SI decoder 204 may store the parsed and/or decoded SI data in the SI & metadata DB 211. The SI data stored in the SI & metadata DB 211 can be read or extracted and used by a component which requires the SI data. EPG data can also be read from the SI & metadata DB 211. This will be described below in detail.

The audio decoder 206 and the video decoder 207 respectively may decode audio data and video data, which are demultiplexed by the demultiplexer 205. The decoded audio data and video data may be provided to the user through the display unit 208.

The application manager may include a service manager 213 and a user interface (UI) manager 214, administrate the overall state of the digital receiver 200, provides a UI, and manage other mangers.

The UI manager 214 can receive a key input from the user and provide a graphical user interface (GUI) related to a receiver operation corresponding to the key input through OSD.

The service manager 213 may control and manage service-related managers such as the service delivery manager 203, the service discovery manager 210, the service control manager 209, and the metadata manager 212.

The service manager 213 may configure a channel map and enable channel control at the request of the user on the basis of the channel map.

The service manager 213 may receive service information corresponding to channel from the SI decoder 204 and set audio/video PID of a selected channel to the demultiplexer 205 so as to control the demultiplexing procedure of the demultiplexer 205.

The application manager can configure an OSD image or control configuration of the OSD image to provide a window for SNS on a predetermined region of the screen when the user requests SNS. The application manager can configure the OSD image or control the configuration of OSD image such that the SNS window can be determined and provided at the request of the user in consideration of other services, for example, a broadcast service. In other words, when the digital receiver 200 may provide a service (for example, SNS) through an image on the screen, the digital receiver 200 may configure the image such that it can appropriately cope with requests in consideration of relationship with other services, priority, etc.

The application manager can receive data for SNS from a related external server such as an SNS providing server or a manufacturer-provided server and store the received data in a memory such that the data is used to configure OSD for providing SNS at the request of the user and SNS may be provided through a predetermined area of the screen. Furthermore, the digital receiver 200 can store data, related with a service and input by the user during the service, in the memory in a similar manner such that the data is used to configure the service and, if required, process the data into a form required for another digital receiver and transmit the processed data to the other digital receiver or a related service server.

In addition, the application manager, the controller or the digital receiver can control information or an action corresponding to a request of the user to be executed when the user makes the request while using the SNS. For example, when the user selects input data of another user or a region corresponding to the input data while using the SNS, the application manager, the controller or the digital receiver may control the first process and/or the second process for handling the selected data or region to be performed and control the first result and/or the second result to be output in an appropriate form. The first result and/or the second result can include information, an action, a related UI, etc. and be configured in various forms such as text, an image, audio/video data, etc. The first result and/or the second result can be manually or automatically provided and performed by the digital receiver.

When the user moves the first result (e.g. image data) to a broadcast program or broadcast service output area through drag & drop, the digital receiver can perform the second process (e.g., search process) on data relating to the first result using an electronic program guide (EPG) or electronic service guide (ESG) (referred to as 'broadcast guide' hereinafter) (i.e., a search engine) to provide a second result. Here, the second result can be provided in a form similar to the broadcast guide used as a search engine or provided as a separately configured UI. When the second result is provided in the form of the broadcast guide, other data can be provided with the second result. In this case, the second result can be configured such that it is distinguished from other data so as to allow the user to easily recognize the second data. To discriminate the second result from other data, the second result can be highlighted, hatched, and provided in 3-dimensional (3D) form.

In the execution of the second process, the digital receiver can automatically determine the type of the second process and whether or not to perform the second process on the basis of a position variation of the first result. In this case, coordinate information of the screen can be used for determining whether the position of the first result is changed or for information on a changed position between the second process and the first result. For example, when a service and/or OSD may be displayed on the screen, the digital receiver can determine and store coordinate information about the displayed service and/or OSD. Accordingly, the digital receiver can be aware of coordinate information about a service and data being provided to the screen in advance and thus can recognize a variation in the position (information) of the first result on the basis of the coordinate information and perform the second process based on the position of the first result.

The service discovery manager 210 may provide information required to select a service provider that provides a service. Upon receipt of a signal for selecting a channel from the service manager 213, the service discovery manager 210 discovers a service on the basis of the received signal.

The service control manager 209 may select and control a service. For example, the service control manager 209 may perform service selection and control using IGMP (Internet Group Management Protocol) or real time streaming protocol (RTSP) when the user selects a live broadcast service and using RTSP when the user selects a video on demand (VOD) service.

The schemes or protocols described in the specification are exemplified in order to aid in understanding of the present invention for convenience of explanations and the scope of the present invention is not limited thereto. Accordingly, the schemes or protocols can be determined in consideration of conditions different from the exemplified ones and other schemes or protocols can be used.

The metadata manager 212 may manage metadata regarding services and store metadata in the SI & metadata DB 211.

The SI & metadata DB 211 may store SI data decoded by the SI decoder 204, metadata managed by the metadata manager 212, and information required to select a service provider, which is provided by the service discovery manager 210. In addition, the SI & metadata DB 211 can store system set-up data.

An IMS (IP Multimedia Subsystem) gateway 250 may include functions required to access an IMS based IPTV services.

Figure 3:
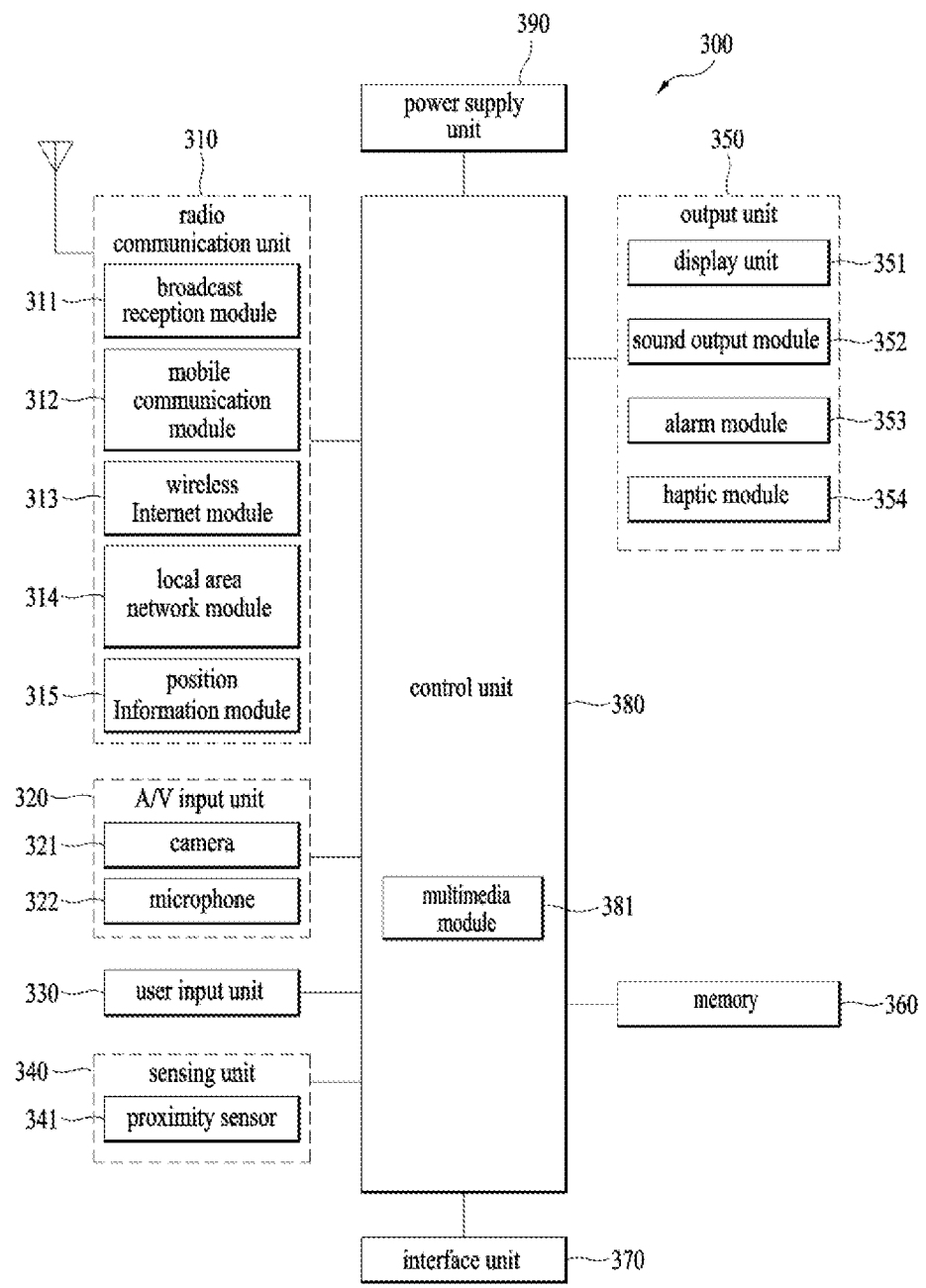
FIG. 3 is a block diagram showing the configuration of a digital device according to another embodiment of the present invention.

FIG. 3 is a block diagram of a mobile terminal 300 in accordance with an embodiment of the present invention. With reference to FIG. 3, the mobile terminal 300 includes a wireless communication unit 310, an A/V (audio/video) input unit 320, an user input unit 330, a sensing unit 340, an output unit 350, a memory 360, an interface unit 370, a controller 380, and a power supply unit 390. FIG. 3 shows the mobile terminal 300 having various components, but it is understood that implementing all of the illustrated components is not a requirement. More or fewer components may be implemented according to various embodiments.

The wireless communication unit 310 typically includes one or more components which permit wireless communication between the mobile terminal 300 and a wireless communication system or network within which the mobile terminal 300 is located. For instance, the wireless communication unit 310 can include a broadcast receiving module 311, a mobile communication module 312, a wireless Internet module 313, a short-range communication module 314, and a position-location module 315.

The broadcast receiving module 311 receives a broadcast signal and/or broadcast associated information from an external broadcast managing server via a broadcast channel. The broadcast channel may include a satellite channel and a terrestrial channel. At least two broadcast receiving modules 311 can be provided in the mobile terminal 300 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 312.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 311 may be configured to receive broadcast signals transmitted from various types of broadcast systems. By non-limiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 311 can be configured to be suitable for other broadcasting systems as well as the above-noted digital broadcasting systems.

The broadcast signal and/or broadcast associated information received by the broadcast receiving module 311 may be stored in a suitable device, such as the memory 360.

The mobile communication module 312 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 313 supports Internet access for the mobile terminal 300. This module may be internally or externally coupled to the mobile terminal 300. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

Wireless Internet access by Wibro™, HSPDA, GSM, CDMA, WCDMA, or LTE is achieved via a mobile communication network. In this regard, the wireless Internet module 313 may be considered as being a kind of the mobile communication module 312 to perform the wireless Internet access via the mobile communication network.

The short-range communication module 314 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 315 identifies or otherwise obtains the location of the mobile terminal 100. According to one embodiment, this module may be implemented with a global positioning system (GPS) module. The GPS module 315 is able to precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and one or more time information are then amended (or corrected) using another satellite. In addition, the GPS module 315 is able to calculate speed information by continuously calculating a real-time current location.

With continued reference to FIG. 3, the audio/video (A/V) input unit 320 is configured to provide audio or video signal input to the mobile terminal 300. As shown, the A/V input unit 320 includes a camera 321 and a microphone 322. The camera 321 receives and processes image frames of still pictures or video, which are obtained by an image sensor in a video call mode or a photographing mode. Furthermore, the processed image frames can be displayed on the display 351.

The image frames processed by the camera 321 can be stored in the memory 360 or can be transmitted to an external recipient via the wireless communication unit 310. Optionally, at least two cameras 321 can be provided in the mobile terminal 300 according to the environment of usage.

The microphone 322 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 312 in a call mode. The microphone 322 typically includes assorted noise removing algorithms to remove noise generated in the course of receiving the external audio signal.

The user input unit 330 generates input data responsive to user manipulation of an associated input device or devices. Examples of such devices include a keypad, a dome switch, a touchpad (e.g., static pressure/capacitance), a jog wheel, and a jog switch.

The sensing unit 340 provides sensing signals for controlling operations of the mobile terminal 300 using status measurements of various aspects of the mobile terminal. For instance, the sensing unit 340 may detect an open/closed status of the mobile terminal 100, the relative positioning of components (e.g., a display and keypad) of the mobile terminal 300, a change of position (or location) of the mobile terminal 300 or a component of the mobile terminal 300, a presence or absence of user contact with the mobile terminal 300, and an orientation or acceleration/deceleration of the mobile terminal 300. As an example, a mobile terminal 300 configured as a slide-type mobile terminal is considered. In this configuration, the sensing unit 340 may sense whether a sliding portion of the mobile terminal is open or closed. According to other examples, the sensing unit 340 senses the presence or absence of power provided by the power supply unit 390, and the presence or absence of a coupling or other connection between the interface unit 370 and an external device. According to one embodiment, the sensing unit 340 can include a proximity sensor 341.

The output unit 350 generates output relevant to the senses of sight, hearing, and touch. Furthermore, the output unit 350 includes the display 351, an audio output module 352, an alarm unit 353, a haptic module 354, and a projector module 355.

The display 351 is typically implemented to visually display (output) information associated with the mobile terminal 300. For instance, if the mobile terminal is operating in a phone call mode, the display will generally provide a user interface (UI) or graphical user interface (GUI) which includes information associated with placing, conducting, and terminating a phone call. As another example, if the mobile terminal 300 is in a video call mode or a photographing mode, the display 351 may additionally or alternatively display images which are associated with these modes, the UI or the GUI.

The display module 351 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 300 may include one or more of such displays.

Some of the displays can be implemented in a transparent or optical transmittive type, i.e., a transparent display. A representative example of the transparent display is the TOLED (transparent OLED). A rear configuration of the display 351 can be implemented as the optical transmittive type as well. In this configuration, a user may be able to see an object located at the rear of a terminal body on a portion of the display 351 of the terminal body.

At least two displays 351 can be provided in the mobile terminal 300 in accordance with one embodiment of the mobile terminal 300. For instance, a plurality of displays can be arranged to be spaced apart from each other or to form a single body on a single face of the mobile terminal 300. Alternatively, a plurality of displays can be arranged on different faces of the mobile terminal 300.

If the display 351 and a sensor for detecting a touch action (hereinafter called 'touch sensor') are configured as a mutual layer structure (hereinafter called 'touch screen'), the display 351 is usable as an input device as well as an output device. In this case, the touch sensor can be configured as a touch film, a touch sheet, or a touchpad.

The touch sensor can be configured to convert pressure applied to a specific portion of the display 351 or a variation of capacitance generated from a specific portion of the display 351 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 380. Therefore, the controller 380 is made aware when a prescribed portion of the display 351 is touched.

Referring to FIG. 3, a proximity sensor 341 can be provided at an internal area of the mobile terminal 300 enclosed by the touch screen or around the touch screen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 341 is more durable than a contact type sensor and also has utility broader than the contact type sensor.

The proximity sensor 341 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen includes the electrostatic capacity proximity sensor, it is configured to detect the proximity of a pointer using a variation of an electric field according to the proximity of the pointer. In this configuration, the touch screen (touch sensor) can be considered as the proximity sensor.

For clarity and convenience of explanation, an action for enabling the pointer approaching the touch screen to be recognized as placed on the touch screen may be named 'proximity touch' and an action of enabling the pointer to actually come into contact with the touch screen may named 'contact touch'. And, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 352 functions in various modes including a call-receiving mode, a call-placing mode, a recording mode, a voice recognition mode, and a broadcast reception mode to output audio data which is received from the wireless communication unit 310 or is stored in the memory 360. During operation, the audio output module 352 outputs audio relating to a particular function (e.g., call received, message received). The audio output module 352 may be implemented using one or more speakers, buzzers, other audio producing devices, and combinations of these devices.

The alarm unit 353 outputs a signal for announcing the occurrence of a particular event associated with the mobile terminal 300. Typical events include a call received, a message received and a touch input received. The alarm unit 353 is able to output a signal for announcing the event occurrence by way of vibration as well as video or audio signal. The video or audio signal can be output via the display 351 or the audio output module 352. Hence, the display 351 or the audio output module 352 can be regarded as a part of the alarm unit 353.

The haptic module 354 generates various tactile effects that can be sensed by a user. Vibration is a representative one of the tactile effects generated by the haptic module 354. The strength and pattern of the vibration generated by the haptic module 354 are controllable. For instance, different vibrations can be output in a manner of being synthesized together or can be output in sequence.

The haptic module 354 is able to generate various tactile effects as well as the vibration. For instance, the haptic module 354 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 354 can be implemented to enable a user to sense the tactile effect through a muscle sense of a finger or an arm as well as to transfer the tactile effect through direct contact. Optionally, at least two haptic modules 354 can be provided in the mobile terminal 300 in accordance with an embodiment of the mobile terminal 300.

The memory 360 is generally used to store various types of data to support the processing, control, and storage requirements of the mobile terminal 300. Examples of such data include program instructions for applications operating on the mobile terminal 300, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 360.

Moreover, data for various patterns of vibration and/or sound output in response to a touch input to the touch screen can be stored in the memory 360.

The memory 360 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 300 is able to operate in association with a web storage for performing a storage function of the memory 360 on the Internet.

The interface unit 370 may be implemented to couple the mobile terminal 100 with external devices. The interface unit 370 receives data from the external devices or is supplied with power and then transfers the data or power to the respective elements of the mobile terminal 300 or enables data within the mobile terminal 300 to be transferred to the external devices. The interface unit 370 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 300 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 300 via the corresponding port.

When the mobile terminal 300 is connected to an external cradle, the interface unit 370 becomes a passage for supplying the mobile terminal 300 with a power from the cradle or a passage for delivering various command signals input from the cradle by a user to the mobile terminal 300. Each of the various command signals input from the cradle or the power can operate as a signal enabling the mobile terminal 300 to recognize that it is correctly loaded in the cradle.

The controller 380 typically controls the overall operations of the mobile terminal 300. For example, the controller 380 performs the control and processing associated with voice calls, data communications, and video calls. The controller 380 may include a multimedia module 381 that provides multimedia playback. The multimedia module 381 may be configured as part of the controller 380, or implemented as a separate component.

Moreover, the controller 380 is able to perform a pattern (or image) recognizing process for recognizing a writing input and a picture drawing input carried out on the touch screen as characters or images, respectively.

The power supply unit 390 provides power required by various components of the mobile terminal 300. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 360, and executed by a controller or processor, such as the controller 380.

Figure 4:
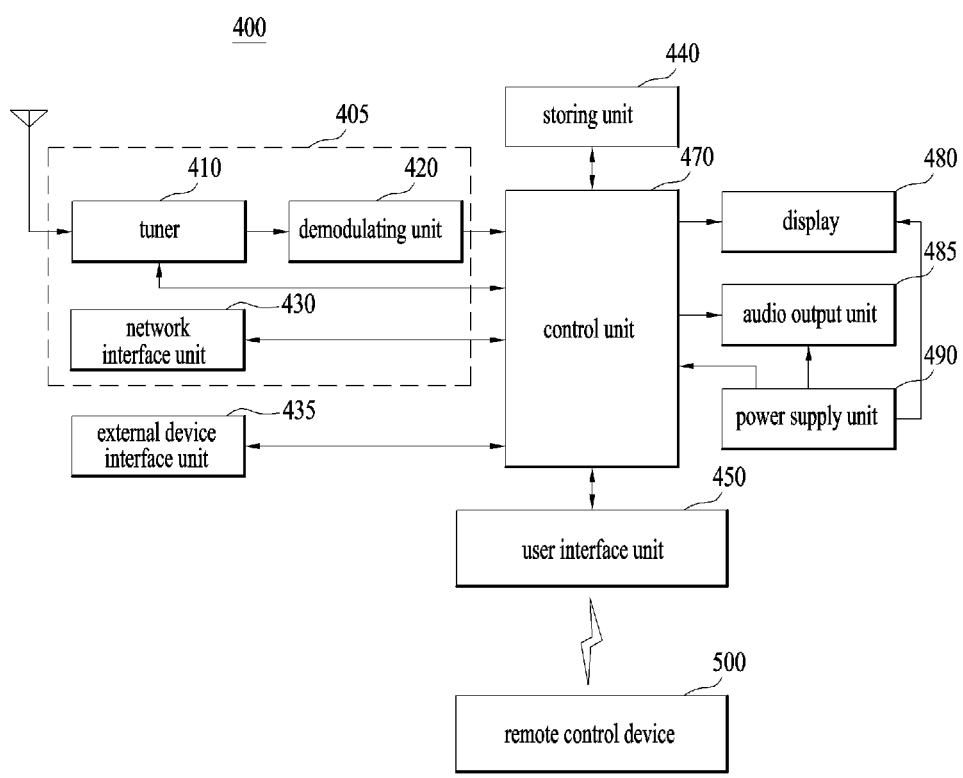
FIG. 4 is a diagram showing a digital device according to another embodiment of the present invention.

FIG. 4 illustrates a digital receiver according to another embodiment of the present invention.

Referring to FIG. 4, an exemplary digital receiver 400 according to the present invention may include a broadcast receiving unit 405, an external device interface 435, a storage unit 440, a user input interface 450, a controller 470, a display unit 480, an audio output unit 485, a power supply unit 490, and a photographing unit (not shown). The broadcast receiving unit 305 may include at least one of one or more tuner 410, a demodulator 420, and a network interface 430. The broadcast receiving unit 405 may include the tuner 410 and the demodulator 420 without the network interface 430, or may include the network interface 430 without the tuner 410 and the demodulator 420. The broadcast receiving unit 405 may include a multiplexer (not shown) to multiplex a signal, which is subjected to the tuner 410 and demodulated by the demodulator 420, and a signal received through the network interface 40. In addition, the broadcast receiving unit 405 can include a demultiplexer (not shown) and demultiplex a multiplexed signal, a demodulated signal, or a signal received through the network interface 430.

The tuner 410 may receive a radio frequency (RF) broadcast signal by tuning to a channel selected by the user from among RF broadcast signals received through an antenna or all previously stored channels.

The demodulator 420 may receive a digital IF (Intermediate Frequency) signal (DIF) converted by the tuner 410 and demodulate the DIF signal.

A stream signal output from the demodulator 420 may be input to the controller 470. The controller 470 can control demultiplexing, audio/video signal processing, etc. Furthermore, the controller 470 can control output of an image through the display unit 480 and output of audio through the audio output unit 485.

The external device interface 435 may provide an environment for interfacing external devices with the digital receiver 400. To implement this, the external device interface 435 may include an A/V input/output unit (not shown) or an RF communication unit (not shown).

The external device interface 435 can be connected with external devices such as a digital versatile disk (DVD), a Blu-ray player, a game device, a camera, a camcorder, a computer (notebook computer), a Cloud and a mobile device (e.g., a Smart Phone, a tablet PC, and the like) in a wired/wireless manner.

The A/V input/output unit may include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

The RF communication unit can perform near field communication. The digital receiver 400 can be networked with other electronic apparatuses according to communication protocols such as Bluetooth, radio frequency identification (RFID), infrared data association (IrDA), ultra wideband (UWB), ZigBee, and digital living network alliance (DLNA), for example.

The network interface 430 may provide an interface for connecting the digital receiver 400 to wired/wireless networks.

Using the network interface 430, the digital receiver can transmit/receive data to/from other users or other electronic apparatuses or access a predetermined web page through a network connected thereto or another network linked to the connected network.

The network interface 430 can selectively receive a desired application from among publicly open applications through a network.

The storage unit 440 may store programs for signal processing and control and store a processed video, audio or data signal.

In addition, the storage unit 440 may execute a function of temporarily storing a video, audio or data signal input from the external device interface 435 or the network interface 430. The storage unit 440 may store information about a predetermined broadcast channel through a channel memory function.

The storage unit 440 can store an application or a list of applications input from the external device interface 435 or the network interface 430. The storage unit 440 may store various platforms which will be described later. The storage unit 440 can include storage media of one or more types, such as a flash memory type, a hard disk type, a multimedia card micro type, a card type memory (e.g. SD or XD memory), RAM, EEPROM, etc. The digital receiver 400 may reproduce content files (a video file, a still image file, a music file, a text file, an application file, etc.) and provide them to the user.

While FIG. 4 illustrates an embodiment in which the storage unit 440 is separated from the controller 470, the configuration of the digital receiver 400 is not limited thereto and the storage unit 440 may be included in the controller 470.

The user input interface 450 may transmit a signal input by the user to the controller 470 or deliver a signal output from the controller 470 to the user.

For example, the user input interface 450 can receive control signals such as a power on/off signal, a channel selection signal, an image setting signal, etc. from the remote controller 500 or transmit control signals of the controller 470 to the remote controller 500 according to various communication schemes such as RF communication, IR communication, and the like.

The user input interface 450 can transmit control signals input through a power key, a channel key, a volume key, and a local key (not shown) of a set value to the controller 470.

The user input interface 450 can transmit a control signal input from a sensing unit (not shown) which senses a gesture of the user or deliver a signal of the controller 470 to the sensing unit (not shown). Here, the sensing unit (not shown) may include a touch sensor, a voice sensor, a position sensor, an action sensor, an acceleration sensor, a gyro sensor, a speed sensor, a tilt sensor, a temperature sensor, a pressure or back-pressure sensor, etc.

The controller 470 can generate and output a signal for video or audio output by demultiplexing streams input through the tuner 410, the demodulator 420 or the external device interface 435 or processing demultiplexed signals.

A video signal processed by the controller 470 can be input to the display unit 380 and displayed as an image through the display unit 480. In addition, the video signal processed by the controller 470 can be input to an external output device through the external device interface 435.

An audio signal processed by the controller 470 can be applied to the audio output unit 485. Otherwise, the audio signal processed by the controller 470 can be applied to an external output device through the external device interface 435.

The controller 470 may include a demultiplexer and an image processor, which are not shown in FIG. 4.

The controller 470 can control the overall operation of the digital receiver 300. For example, the controller 470 can control the tuner 410 to tune to an RF broadcast corresponding to a channel selected by the user or a previously stored channel.

The controller 470 can control the digital receiver 400 according to a user command input through the user input interface 450 or an internal program. Particularly, the controller 470 can control the digital receiver 400 to be linked to a network to download an application or application list that the user desires to the digital receiver 400.

For example, the controller 470 may control the tuner 410 to receive a signal of a channel selected in response to a predetermined channel selection command received through the user input interface 450. In addition, the controller 470 may process a video, audio or data signal corresponding to the selected channel. The controller 470 may control information on a channel selected by the user to be output with a processed video or audio signal through the display unit 480 or the audio output unit 485.

Alternatively, the controller 470 may control a video signal or an audio signal received from an external apparatus, for example, a camera or a camcorder through the external device interface 435 to be output through the display unit 480 or the audio output unit 485 according to an external device image reproduction command received through the user input interface 450.

The controller 470 can control the display unit 480 to display images. For example, the controller 470 can control a broadcast image input through the tuner 410, an external input image received through the external device interface 435, an image input through the network interface 430, or an image stored in the storage unit 440 to be displayed on the display unit 480. Here, an image displayed on the display unit 480 can be a still image or video, and it can be a 2D or 3D image.

The controller 470 can control reproduction of content. Here, the content may be content stored in the digital receiver 400, received broadcast content, or content input from an external device. The content may include at least one of a broadcast image, an external input image, an audio file, a still image, an image of a linked web, and a text file.

The controller 470 can control display of applications or an application list, downloadable from the digital receiver 400 or an external network, when an application view menu is selected.

The controller 470 can control installation and execution of applications downloaded from an external network in addition to various user interfaces. Furthermore, the controller 470 can control an image relating to an application executed by user selection to be displayed on the display unit 480.

The digital receiver 400 may further include a channel browsing processor (not shown) which generates a thumbnail image corresponding to a channel signal or an external input signal.

The channel browsing processor can receive a stream signal (e.g., TS) output from the demodulator 420 or a stream signal output from the external device interface 435 and extract an image from the received stream signal to generate a thumbnail image. The generated thumbnail image can be directly input to the controller 470 or can be encoded and then input to the controller 470. Also, the thumbnail image can be coded into a stream and then applied to the controller 470. The controller 470 can display a thumbnail list including a plurality of thumbnail images on the display unit 480 using thumbnail images input thereto. The thumbnail images included in the thumbnail list can be updated sequentially or simultaneously. Accordingly, the user can conveniently check content of a plurality of broadcast channels.

The display unit 480 may convert a video signal, a data signal, and an OSD signal processed by the controller 470 and a video signal and a data signal received from the external device interface 435 into RGB signals to generate driving signals. The display unit 480 may be a PDP, an LCD, an OLED, a flexible display, a 3D display or the like. The display unit 480 may be configured as a touch-screen and used as an input device rather than an output device. The audio output unit 485 receives a signal audio-processed by the controller 470, for example, a stereo signal, a 3.1 channel signal or a 5.1 channel signal, and outputs the received signal as audio. The audio output unit 485 can be configured as one of various speakers.

The digital receiver 400 may further include the sensing unit (not shown) for sensing a gesture of the user, which includes at least one of a touch sensor, a voice sensor, a position sensor, and an action sensor, as described above. A signal sensed by the sensing unit (not shown) can be delivered to the controller 470 through the user input interface 450. The digital receiver 400 may further include the photographing unit (not shown) for photographing the user. Image information acquired by the photographing unit (not shown) can be supplied to the controller 470. The controller 470 may sense a gesture of the user from an image captured by the photographing unit (not shown) or a signal sensed by the sensing unit (not shown), or by combining the image and the signal.

The power supply unit 490 may supply power to the digital receiver 400. Particularly, the power supply unit 490 can supply power to the controller 470 which can be implemented as a system-on-chip (SoC), the display unit 480 for displaying images, and the audio output unit 485 for audio output.

The remote controller 500 may transmit user input to the user input interface 450. To achieve this, the remote controller 500 can use Bluetooth, RF communication, IR communication, UWB, ZigBee, etc. In addition, the remote controller 500 can receive audio, video or data signal output from the user input interface 350 and display the received signal or output the same as audio or vibration.

The functions of the application manager shown in FIG. 2 can be divided and executed by the controller 470, the storage unit 440, the user interface 450, the display unit 480 and the audio output unit 485 which are controlled by the controller 470.

The digital receivers shown in FIGS. 2 and 4 are exemplary and components thereof can be integrated, added or omitted according to specifications thereof. That is, two or more components can be integrated into one component or one component can be subdivided into two or more components as required. The function executed by each component is exemplified to describe embodiments of the present invention and detailed operations or devices do not limit the scope of the present invention. Some of the components shown in FIG. 2 may be omitted or a component (not shown in FIG. 2) may be added as required. The digital receiver according to the present invention may not include the tuner and the demodulator, differently from the digital receivers shown in FIGS. 2 and 4, and may receive content through the network interface or the external device interface and reproduce the content.

The digital receiver is an example of image signal processors which process an image stored therein or an input image. Other examples of the image signal processors may include a set-top box (STB) which does not include the display unit 380 and the audio output unit 485 shown in FIG. 4, a DVD player, a Blu-ray player, a game device, a computer, etc.

Figure 5:
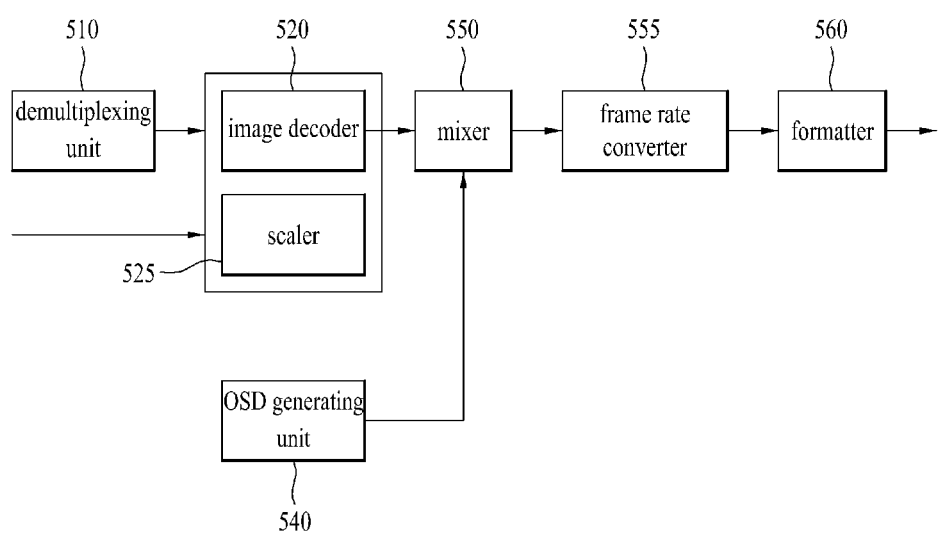
FIG. 5 is a block diagram showing the detailed configuration of each of controllers of FIGS. 2 to 4 according to one embodiment of the present invention.

FIG. 5 illustrates a digital receiver according to another embodiment of the present invention. Particularly, FIG. 5 shows a configuration for implementing a 3D digital receiver, which can be included in the configurations of FIGS. 2 and 3.

The digital receiver according to the present invention may include a demultiplexer 510, an image processor 520, an OSD generator 540, a mixer 550, a frame rate converter (FRC) 555, and a 3D formatter (or an Output formatter) 560.

The demultiplexer 510 can demultiplex an input stream signal into an MPEG-2 TS image, an audio signal and a data signal, for example.

The image processor can process a demultiplexed image signal using a video decoder 525 and a scaler 535. The video decoder 525 can decode the demultiplexed image signal and the scaler 535 can scale the resolution of the decoded image signal such that the image signal can be displayed.

The image signal decoded by the image processor 520 may be input to the mixer 550.

The OSD generator 540 may generate OSD data automatically or according to user input. For example, the OSD generator 540 may generate data to be displayed on the screen of an output unit in the form of an image or text on the basis of a control signal of a user input interface. OSD data generated by the OSD generator 540 may include various data such as a user interface image of the digital receiver, various menu screens, widget, icons, and information on ratings. The OSD generator 540 can generate a caption of a broadcast image or data for displaying EPG based broadcast information.

The mixer 550 may mix the OSD data generated by the OSD generator 540 and the image signal processed by the image processor 520. The mixer 550 may provide the mixed signal to the 3D formatter 560. By mixing the decoded image signal and the OSD data, OSD may be overlaid on a broadcast image or external input image.

The frame rate converter (FRC) 555 may convert a frame rate of input video. For example, the frame rate converter 555 can convert the frame rate of an input 60 Hz video to a frame rate of 120 Hz or 240 Hz, according to an output frequency of the output unit. The frame rate converter 555 may be bypassed when frame conversion is not executed.

The 3D formatter 560 may change the output of the frame rate converter 555, which is input thereto, into a form suitable for the output format of the output unit. For example, the 3D formatter 560 can output an RGB data signal. In this case, this RGB data signal can be output according to low voltage differential signaling (LVDS) or mini-LVDS. When a 3D image signal output from the frame rate converter 555 is input to the 3D formatter 560, the 3D formatter 560 can format the 3D image signal such that the 3D image signal is matched to the output format of the output unit, to thereby support a 3D service.

An audio processor (not shown) may audio-process a demultiplexed audio signal. The audio processor (not shown) can support various audio formats. For example, when audio signals are encoded in MPEG-2, MPEG-4, advanced audio coding (AAC), high efficiency-AAC (HE-AAC), AC-3 and bit sliced audio coding (BSAC) formats, the audio processor (not shown) can include decoders corresponding to the formats to process the audio signals. Furthermore, the audio processor (not shown) can control base, treble and volume.

In addition, a data processor (not shown) can process a demultiplexed data signal. For example, when a demultiplexed data signal is encoded, the data processor (not shown) can decode the encoded demultiplexed data signal. Here, the encoded data signal may be EPG information including broadcast information such as the start time and end time (or duration) of a broadcast program which is broadcast through each channel.

Meanwhile, the above-described digital device is one example according to the present invention. And, at least one of the components may be integrated, added or omitted depending on options of an actually embodied digital device. In particular, if necessary, at least two or more components can be integrated into a single component or a prescribed component can be divided into at least two or more components. Moreover, a function performed by each block is provided to describe one embodiment of the present invention. A detailed operation or device for the function may non-limit the scope of the appended claims and their equivalents of the present invention.

A digital device may include an image signal processing device configured to process a signal of an image saved in the corresponding device or a signal of an inputted image. Examples of the image signal processing device may include a settop box (STB) failing to include the display unit 480 and the audio output unit 485 shown in FIG. 4, the aforementioned DVD player, a Blu-ray player, a game device, a computer and the like.

Figure 6:
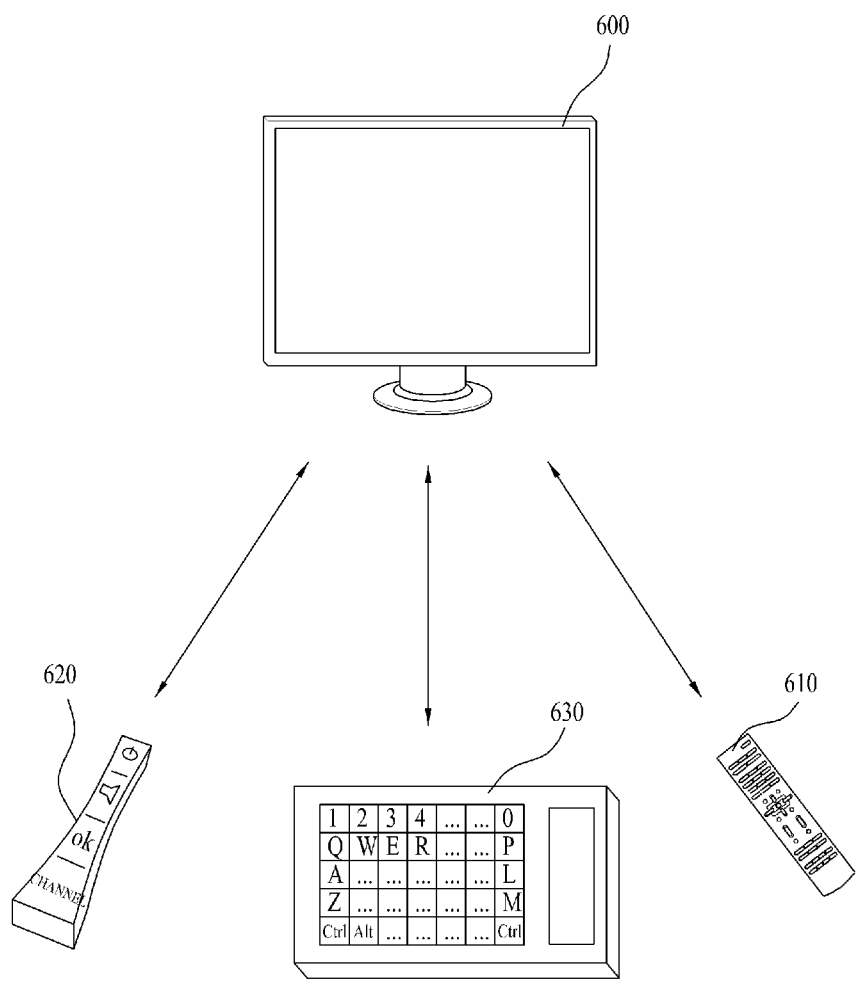
FIG. 6 is a diagram showing an input unit connected to each of the digital devices of FIGS. 2 to 4 according to one embodiment of the present invention.

FIG. 6 is a diagram of an input means connected to each of the digital devices shown in FIGS. 2 to 4 according to one embodiment of the present invention.

Referring to FIG. 6, in order to control a digital device 600, a front panel (not shown in the drawing) or a control means (e.g., an input means) installed in the digital device 600 is used.

In particular, as a user interface device (UID) capable of a wire/wireless communication, the control means includes a remote controller 610, a key board 630, a pointing device 620, a touchpad, or the like, mainly embodied for the purpose of controlling the digital device 600. And, a control means dedicated to an external input by being connected to the digital device 600 may be included as well. Besides, the control means may further include a mobile device (e.g., a smartphone, a tablet PC, etc.) capable of controlling the digital device 600 through a mode switching or the like despite not having the purpose of controlling the digital device 600. For clarity, a pointing device is taken as one example for the description in the present specification, by which the present invention is non-limited.

The input means can communicate with the digital device by employing at least one of communication protocols as necessary. In this case, the communication protocols may include Bluetooth, RFID (Radio Frequency Identification), IrDA (infrared Data Association), UWB (Ultra Wideband), ZigBee, DLNA (Digital Living Network Alliance), RS and the like.

The remote controller 610 is a general input means provided with various key buttons required for controlling the digital device 600.

The pointing device 620 provided with a gyro sensor and the like delivers a prescribed control command to the digital device 600 by embodying a corresponding pointer on a screen of the digital device 600 based on a user's motion, a pressure, a rotation and the like. The pointing device 620 may be called one of various names such as a magic remote controller, a magic controller and the like.

As the digital device 600 is an intelligence integrated digital device capable of providing various services such as a web browser, an application, an SNS (social network service) and the like as well as broadcasts, it is difficult to control the digital device 600 using a conventional remote controller 610. Hence, the keyboard 630 is embodied into a configuration similar to a PC keyboard to facilitate inputs of text and the like by complementing the control difficulty.

Meanwhile, the control means such as the remote controller 610, the pointing device 620, the keyboard 630, or the like is provided with a touchpad as necessary and is usable for the various control purposes of facilitating text inputs, pointer shifts, zoom-in/out of photo or video, and the like.

The digital device described in the present specification uses OS and/or WebOS as a platform. Hereinafter, such a processing as a WebOS based configuration or algorithm may be performed by the controller of the above-described digital device and the like. In this case, the controller is used in a broad sense including the controllers shown in FIGS. 2 to 5. Hence, in the following description, regarding a configuration for processing WebOS based or related services, applications, contents and the like in a digital device, hardware or component including software, firmware and the like is named a controller.

Such a WebOS based platform may improve development independency and functional extensibility by integrating services, applications and the like based on Luna-service Bus for example and is able to increase application development productivity based on a web application framework. In addition, system resources and the like are efficiently used through a WebOS process and resource management, whereby multitasking can be supported.

Meanwhile, a WebOS platform described in the present specification may be available not only for stationary devices such as personal computers (PCs), TVs and settop boxes (STBs) but also for mobile devices such as cellular phones, smartphones, tablet PCs, laptops, wearable devices, and the like.

A software structure for a digital device is a monolithic structure capable of solving conventional problems depending on markets and has difficulty in external application with a multi-threading based signal process and closed product. In pursuit of new platform based development, cost innovation through chipset replacement and UI application and external application development efficiency, layering and componentization are performed to obtain a 3-layered structure and an add-on structure for an add-on, a single source product and an open application. Recently, modular design of a software structure has been conducted in order to provide a web open application programming interface (API) for an echo system and modular architecture of a functional unit or a native open API for a game engine, and thus a multi-process structure based on a service structure has been produced.

For clarity of the description with respect to the present invention, a digital device is assumed as the former digital device described with reference to FIG. 3 and an external device connecting a communication with a digital device is assumed as the former digital device described with reference to FIG. 2, by which the present invention is non-limited.

In the following description, examples of a method for a digital device to control a $2^{nd}$ external device using a setting data and a play information of at least one content, which are received from a $1^{st}$ external device, are described with reference to FIGS. 7 to 20.

Figure 7:
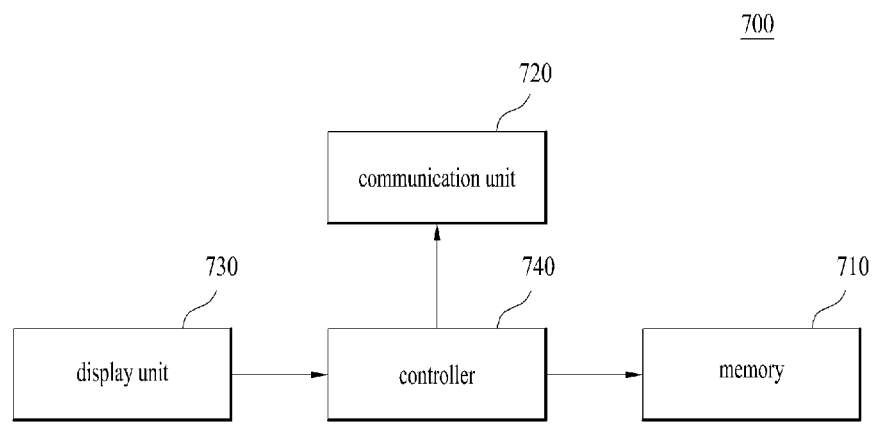
FIG. 7 is a block diagram for configuration modules of a digital device according to one embodiment of the present invention.

FIG. 7 is a block diagram for configuration modules of a digital device according to one embodiment of the present invention.

Referring to FIG. 7, a digital device 700 according to one embodiment of the present invention may include a memory 710, a communication unit 720, a display unit 730, a controller 740 and the like. The configuration modules shown in FIG. 7 and other configuration modules failing to be shown in FIG. 7 can refer to the configurations shown in FIGS. 1 to 6.

The memory 710 may store various programs, applications, algorithms and the like, which are required for operations of the digital device 700. According to the present embodiment, a specific application for performing a function of controlling a $1^{st}$ external device may be saved in the memory 710 in advance. In particular, the specific application may include an application for performing a function of controlling the former digital device described with reference to FIG. 2. For instance, the specific application may include an application for performing a function of a remote controller of a TV. And, the memory 710 may store a play information of at least one content played in an external device and a setting data of the external device. In this case, the play information and the setting data may be received through the communication unit 720. Moreover, the memory 710 may be embodied into the former memory 360 shown in FIG. 3.

The communication unit 720 can connect a communication to an external device. The communication unit 720 can receive at least one of a play information of at least one content played in the external device and a setting data of the external device from the external device. The communication unit 720 can transmit at least one of the received play information of the at least one content and the received setting data of the external device to another external device different from the former external device. And, the communication unit 720 may be embodied into the wireless communication unit 310 shown in FIG. 3.

The display unit 730 can display a running screen of the specific application. In doing so, the running screen may contain at least one indicator corresponding to each of the at least one content played in the external device or may contain an indicator corresponding to a function of changing the settings of the external device. And, the display unit 730 may be embodied into the display unit 351 shown in FIG. 3.

The controller 740 controls operations of the digital device 700 and also manages functions of the memory 710, the communication unit 720 and the display unit 730 overall. And, the controller 740 may be embodied into the former controller 380 shown in FIG. 3.

Meanwhile, according to one embodiment of the present invention, the controller 740 of the digital device 700 connects a communication with an external device (e.g., the former digital device described with reference to FIG. 2) and is then able to receive at least one of a play information of at least one content played in the external device and a setting data of the external device. This is described in detail with reference to FIG. 8 as follows.

Figure 8:
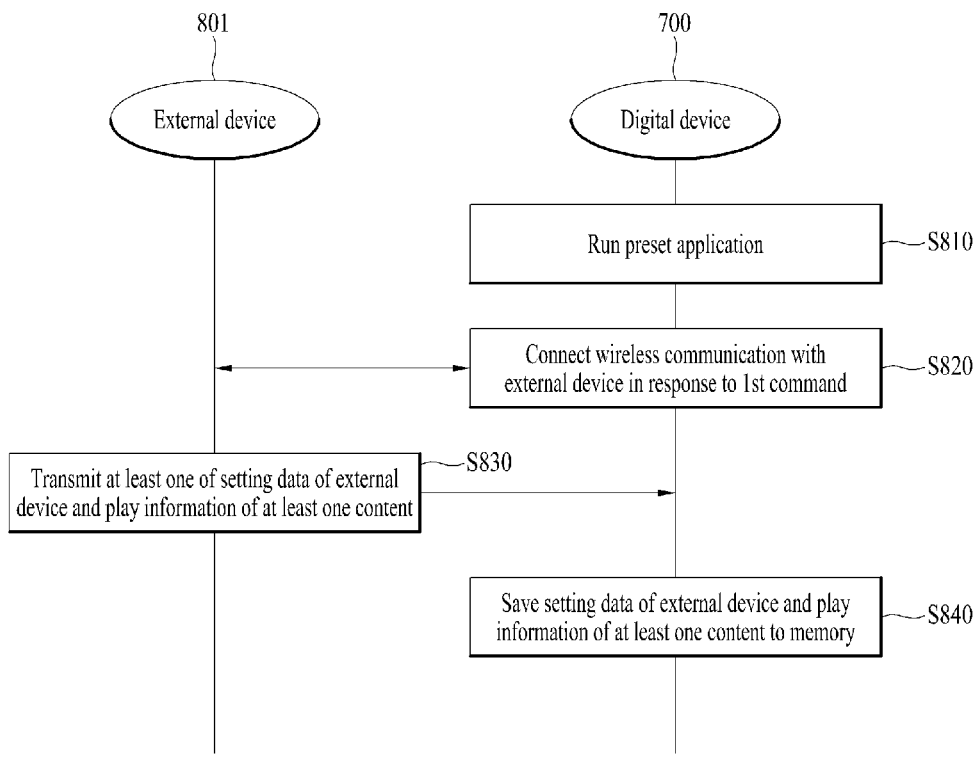
FIG. 8 is a flowchart to describe one example of a method for a digital device to receive at least one of a play information of at least one content and setting data of an external device from the external device according to one embodiment of the present invention.

FIG. 8 is a flowchart to describe one example of a method for a digital device to receive at least one of a play information of at least one content and setting data of an external device from the external device according to one embodiment of the present invention.

Referring to FIG. 8, if detecting a command for running a preset application, the controller 740 of the digital device 700 can run the preset application [S810].

In this case, the preset application may have been saved in the memory 710 already. In particular, the preset application may include an application for performing a function of controlling an external device 801. For instance, assuming that the external device 801 is a TV, an application for performing a function of a remote controller of the TV may be the preset application.

In more particular, the preset application may include an application having been saved in the main device 700 since the release to the market or an application installed on upgrading an application program or firmware of the main device 700.

In case of detecting a $1^{st}$ command, the controller 740 can control the communication unit 720 to connect a communication with the external device 801 in response to the $1^{st}$ command [S820]. For instance, the $1^{st}$ command may include a command for searching for at least one external device capable of connecting a communication with the digital device 700, selecting a prescribed external device 801 from the found at least one external device, and then connecting a communication with the selected external device 801. In this case, the communication unit 720 may include at least one of the mobile communication module 312, the short range communication module 314 and the wireless internet module 313, which are shown in FIG. 3. And, the communication unit 720 may be able connect a wired communication with the selected external device 801 as well as a wireless communication.

The controller 740 of the digital device 700 may control the communication unit 720 to receive at least one of a setting data of the external device 801 and a play information of at least one content from the external device 801. In particular, in aspect of the external device 801, the external device 801 can transmit at least one of the setting data of the external device 801 and the play information of the at least one content to the digital device [S830].

For instance, in case of detecting a command for disconnecting the wireless communication with the external device 801, the controller 740 of the digital device 700 may control the communication unit 720 to transmit a specific signal to the external device 801. And, the controller 740 can control the communication unit 720 to receive at least one of the setting data of the external device 801 and the play information of the at least one content to correspond to the specific signal.

For another instance, in case that a content currently displayed on the external device 801 is changed, the controller 740 can control the communication unit 720 to receive a play information of a content before the change. In doing so, the controller 740 can control the communication unit 720 to receive the play information of the at least one content previously displayed on the external device 801 over a preset time.

For further instance, if a setting value (e.g., an audio setting value) is changed in the external device 801, the controller 740 can control the communication unit 720 to receive a setting data containing information on the changed setting value of the external device 801.

Eventually, if a status of the external device 801 is changed (e.g., if a content displayed on the external device is changed, if a setting in the external device is changed, etc.) or before a communication connection between the external device 801 and the digital device 700 is disconnected, the controller 180 can control the communication unit 720 to receive at least one of the setting data of the external device 801 and the play information of the at least one content.

In the step S830, the setting data of the external device 801 may include at least one of an audio setting information (e.g., a sound level, etc.) of the external device 801, a video setting information (e.g., a brightness, a contrast, etc.) of the external device 801, a channel setting information (e.g., a preferred channel, a registered channel, etc.), a viewing reservation setting information, a recording reservation setting information, an alarm setting information, and a user information (e.g., a user account information, a user age, a user gender, a user's country, user's residence area, etc.). In particular, the setting data may be the data that includes the user-set information on the user and the information on the setting values set in the external device 801 all.

In the step S830, the play information, which is received from the external device, of the at least one content may include at least one of information on an application having each of the at least one content played thereon, a date having each of the at least one content played thereon, a time having each of the at least one content played thereon, a title of the at least one content, an image corresponding to each of the at least one content, and information on a timing point of ending a play of each of the at least one content.

After the step S830, the controller 740 of the digital device 700 can save the received setting data of the external device and the received play information of the at least one content to the memory [S840].

Meanwhile, according to one embodiment of the present invention, the controller 740 can control the communication unit 720 to connect a communication with a $2^{nd}$ external device different from the external device and is able to transmit a control signal containing a play information of a specific content in order for the specific content to be playable in the communication-connected $2^{nd}$ external device. This is described in detail with reference to FIG. 9 as follows.

Figure 9:
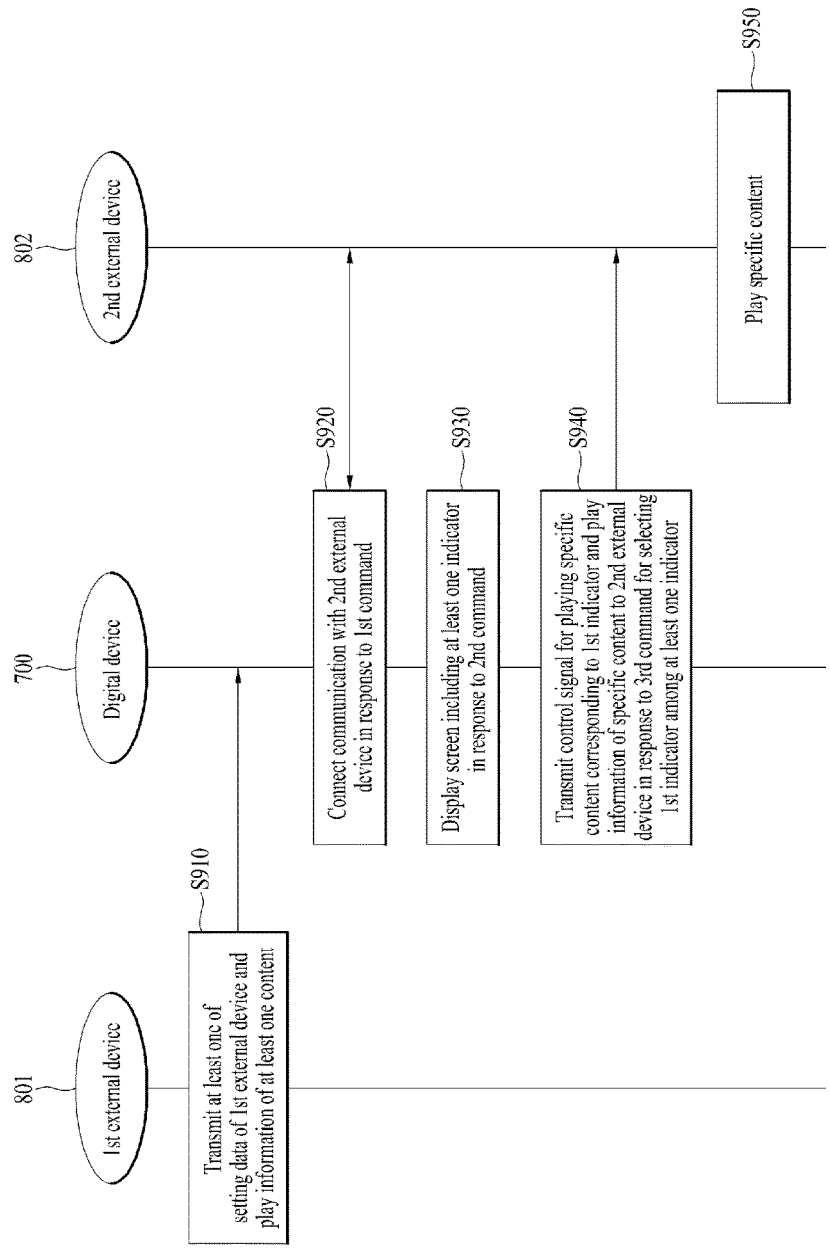
FIG. 9 is a flowchart to describe one example of a method for a digital device to transmit a control signal including a play information of a specific content to a specific external device in order for the specific content to be played in the specific external device according to one embodiment of the present invention.

FIG. 9 is a flowchart to describe one example of a method for a digital device to transmit a control signal including a play information of a specific content to a specific external device in order for the specific content to be played in the specific external device according to one embodiment of the present invention. Regarding the description with reference to FIG. 9, the contents redundant with the foregoing description with reference to FIG. 8 shall not be mentioned again and the following description shall be made centering on the differences.

Referring to FIG. 9, the controller 740 of the digital device 700 can receive at least one of a setting data of a $1^{st}$ external device 801 and a play information of at least one content from the communication-connected $1^{st}$ external device 801 [S910]. And, the controller 740 of the digital device 700 can save at least one of the received setting data of the $1^{st}$ external device 801 and the received play information of the at least one content to the memory 710. In this case, the $1^{st}$ external device 801 is a device having a communication connected to the digital device 700 and may include the former digital device described with reference to FIG. 2. Since the step S910 is redundant with the former description with reference to FIG. 8, its details shall be omitted from the following description.

In response to a $1^{st}$ command, the digital device 700 can control the communication unit 720 to connect a communication with a $2^{nd}$ external device 802 [S920]. In particular, the communication unit 720 may include at least one of the mobile communication module 312, the short range communication module 314 and the wireless internet module 313, which are shown in FIG. 3. And, the communication unit 720 may be able connect a wired communication with the $2^{nd}$ external device 802 as well as a wireless communication.

For instance, the controller 740 of the digital device 700 can control the communication unit 720 to connect the communication with the $2^{nd}$ external device 802 after disconnecting the communication connection with the $1^{st}$ external device 801.

For another instance, the controller 740 of the digital device 700 can control the communication unit 720 to connect the communication with the $2^{nd}$ external device 802 by maintaining the communication connection with the $1^{st}$ external device 801.

In response to a $2^{nd}$ command, the controller 740 can control the display unit 730 to display a screen including at least one indicator [S930]. In particular, the at least one indicator may include at least one indicator created based on the play information, which is received from the $1^{st}$ external device 801, of the at least one content. Moreover, the at least one indicator may include at least one $2^{nd}$ indicator corresponding to a function of changing the setting of the $2^{nd}$ external device 802 using the setting data of the $1^{st}$ external device 801.

In response to a $3^{rd}$ command for selecting a $1^{st}$ indicator from the at least one indicator corresponding to each of at least one content, the controller 740 can control the communication unit 720 to transmit a control signal for playing a specific content corresponding to the $1^{st}$ indicator and a play information of the specific content to the $2^{nd}$ external device 802 [S940]. In this case, the control signal for playing the specific content may include the play information of the specific content. The play information of the specific content may include information on a timing point at which the specific content corresponding to the $1^{st}$ indicator stopped being played in the $1^{st}$ external device 801.

If the control signal for playing the specific content corresponding to the $1^{st}$ indicator and the play information of the specific content are received in the step S940, the $2^{nd}$ external device 802 can play the specific content [S950]. In doing so, the $2^{nd}$ external device 802 can control the specific content to be played in continuation with the timing point, at which the specific content stopped being played, using the play information of the specific content. In particular, it may bring an effect that a user can watch the same content continuously despite using different external devices.

Meanwhile, according to one embodiment of the present invention, the controller 740 can change the settings of the $2^{nd}$ external device 802 using the setting data received from the $1^{st}$ external device 801. This is described in detail with reference to FIG. 10 as follows.

Figure 10:
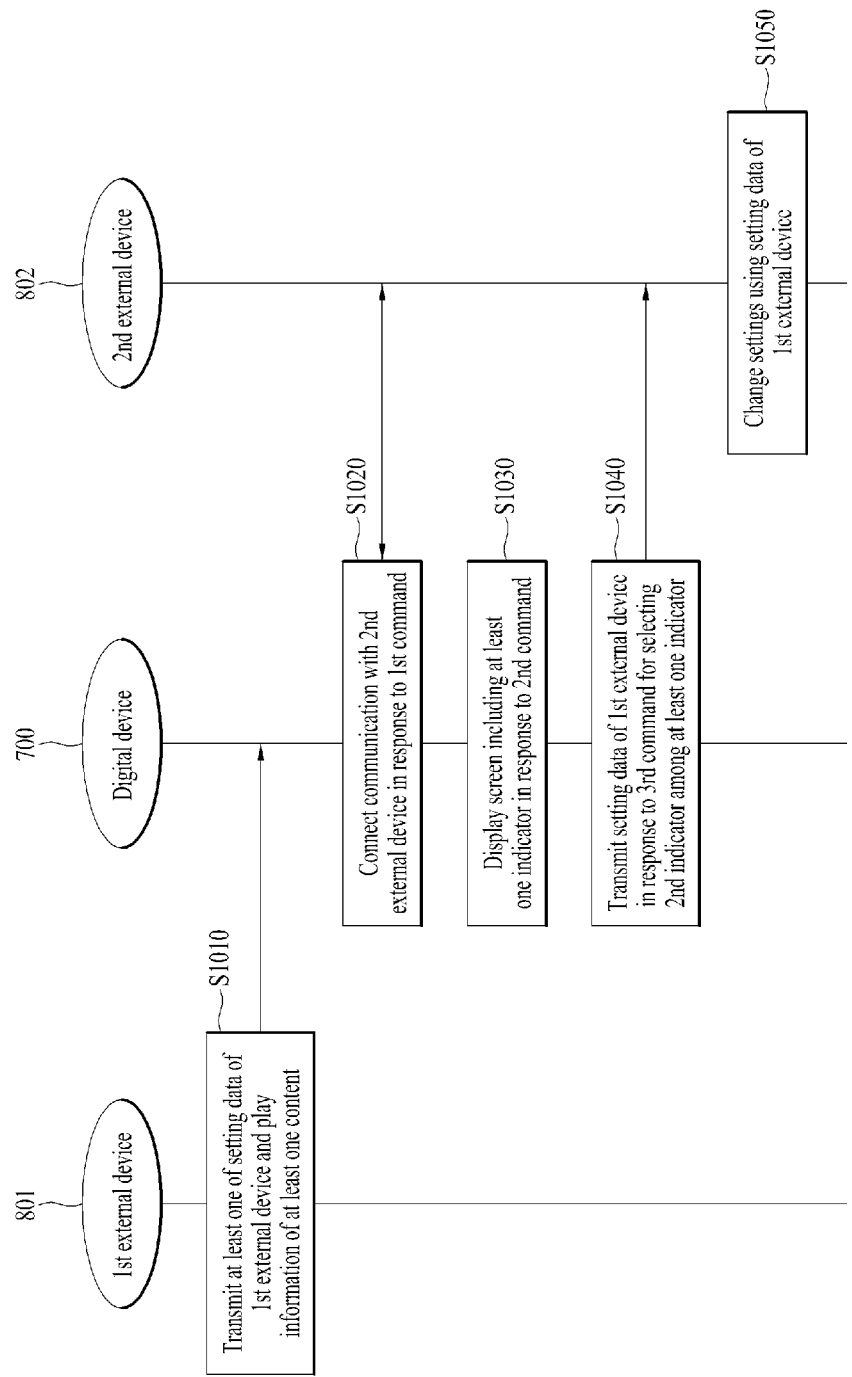
FIG. 10 is a flowchart to describe one example of a method for a digital device to change settings of a $2^{nd}$ external device using setting data received from a $1^{st}$ external device.

FIG. 10 is a flowchart to describe one example of a method for a digital device to change settings of a $2^{nd}$ external device using setting data received from a $1^{st}$ external device. Regarding the description with reference to FIG. 10, the contents redundant with the foregoing description with reference to FIG. 8 shall not be mentioned again and the following description shall be made centering on the differences.

Referring to FIG. 10, the controller 740 of the digital device 700 can receive at least one of a setting data of a $1^{st}$ external device 801 and a play information of at least one content from the communication-connected $1^{st}$ external device 801 [S1010]. And, the controller 740 of the digital device 700 can save at least one of the received setting data of the $1^{st}$ external device 801 and the received play information of the at least one content to the memory 710. In this case, the $1^{st}$ external device 801 is a device having a communication connected to the digital device 700 and may include the former digital device described with reference to FIG. 2. Since the step S1010 is redundant with the former description with reference to FIG. 8, its details shall be omitted from the following description.

In response to a $1^{st}$ command, the digital device 700 can control the communication unit 720 to connect a communication with a $2^{nd}$ external device 802 [S1020]. In particular, the communication unit 720 may include at least one of the mobile communication module 312, the short range communication module 314 and the wireless internet module 313, which are shown in FIG. 3. And, the communication unit 720 may be able connect a wired communication with the $2^{nd}$ external device 802 as well as a wireless communication.

For instance, the controller 740 of the digital device 700 can control the communication unit 720 to connect the communication with the $2^{nd}$ external device 802 after disconnecting the communication connection with the $1^{st}$ external device 801.

For another instance, the controller 740 of the digital device 700 can control the communication unit 720 to connect the communication with the $2^{nd}$ external device 802 by maintaining the communication connection with the $1^{st}$ external device 801.

In response to a $2^{nd}$ command, the controller 740 can control the display unit 730 to display a screen including at least one indicator [S1030]. In particular, the at least one indicator may include at least one indicator created based on the play information, which is received from the $1^{st}$ external device 801, of the at least one content. Moreover, the at least one indicator may include at least one $2^{nd}$ indicator corresponding to a function of changing the setting of the $2^{nd}$ external device 802 using the setting data of the $1^{st}$ external device 801.

The setting data of the external device 801 may include at least one of an audio setting information (e.g., a sound level, etc.) of the external device 801, a video setting information (e.g., a brightness, a contrast, etc.) of the external device 801, a channel setting information (e.g., information on a channel set as a preferred channel, information on a channel registered as a channel, etc.), a viewing reservation setting information, a recording reservation setting information, an alarm setting information, and a user information (e.g., a user account information, a user age, a user gender, a user's country, user's residence area, etc.). In particular, the setting data may be the data that includes the user information and the information on the setting values set in the external device 801 all.

The screen may include at least one $2^{nd}$ indicator corresponding to each information included in the setting data. For instance, the screen may include an indicator corresponding to a function of changing an audio setting of the $2^{nd}$ external device 802 to correspond to an audio setting of the $1^{st}$ external device 801, an indicator corresponding to a function of changing a video setting of the $2^{nd}$ external device 802 to correspond to a video setting of the $1^{st}$ external device 801, an indicator corresponding to a function of changing a preferred channel of the $2^{nd}$ external device 802 to correspond to a preferred channel of the $1^{st}$ external device 801, and the like.

In response to a $3^{rd}$ command for selecting a prescribed $2^{nd}$ indicator from the at least one or more indicators, the controller 740 can transmit the setting data of the $1^{st}$ external device 801 corresponding to the selected $2^{nd}$ indicator to the $2^{nd}$ external device 802 [S1040].

For instance, in response to a user command for selecting an indicator corresponding to a function of changing an audio setting of the $2^{nd}$ external device 802 to correspond to an audio setting of the $1^{st}$ external device 801 from the at least one or more indicators included in the screen, the controller 740 can control the communication unit 720 to transmit a setting data (e.g., an audio setting data set in the $1^{st}$ external device 801, etc.) corresponding to the selected indicator to the $2^{nd}$ external device 802.

For another instance, in response to a user command for selecting an indicator corresponding to a function of changing a preferred channel of the $2^{nd}$ external device 802 to correspond to a preferred channel of the $1^{st}$ external device 801 from the at least one or more indicators included in the screen, the controller 740 can control the communication unit 720 to transmit a setting data (e.g., a data for a preferred channel set in the $1^{st}$ external device 801, etc.) corresponding to the selected indicator to the $2^{nd}$ external device 802.

In case of receiving the setting data of the $1^{st}$ external device 801 corresponding to the selected $2^{nd}$ indicator in the step S1040, the $2^{nd}$ external device 802 can change the setting of the $2^{nd}$ external device 802 using the received setting data of the $1^{st}$ external device 801 [S1050].

For instance, in case that the $2^{nd}$ external device 802 receives the audio setting data of the $1^{st}$ external device 801 from the digital device 700, the $2^{nd}$ external device 802 can change the audio setting of the $2^{nd}$ external device 802 using the received audio setting data. In particular, the $2^{nd}$ external device 802 can change the audio setting value of the $2^{nd}$ external device 802 so that an audio setting value of the $2^{nd}$ external device 802 corresponds to an audio setting value of the $1^{st}$ external device 801.

For another instance, in case that the $2^{nd}$ external device 802 receives data for a preferred channel set in the $1^{st}$ external device 801 from the digital device 700, the $2^{nd}$ external device 802 can change a preferred channel of the $2^{nd}$ external device 802 using the received data for the preferred channel. In particular, the $2^{nd}$ external device 802 can change the preferred channel of the $2^{nd}$ external device 802 so that a preferred channel of the $2^{nd}$ external device 802 corresponds to a preferred channel set in the $1^{st}$ external device 801.

Examples of a screen displayed on the digital device 700 in the step S930/S1030 shown in FIG. 9/FIG. 10 are described in detail with reference to FIGS. 11 to 15 as follows.

Figure 11:
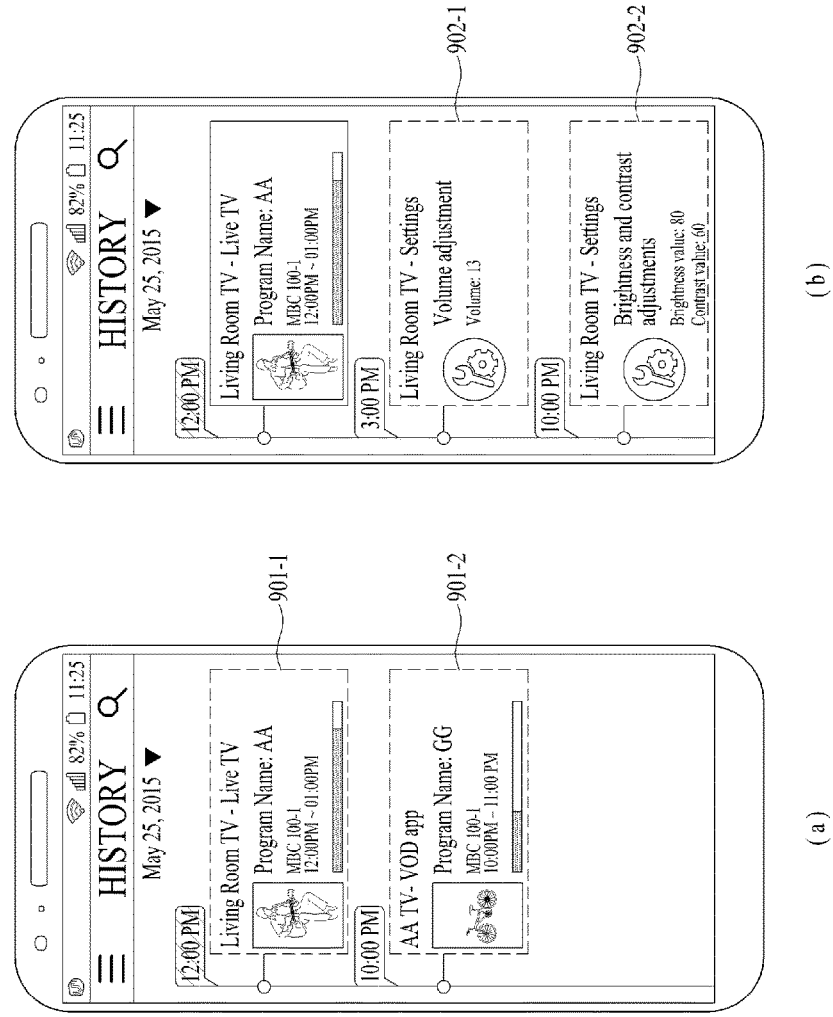
FIG. 11 is a diagram to describe examples of a screen displayed on a digital device in response to a specific command a method of according to one embodiment of the present invention.

FIG. 11 is a diagram to describe examples of a screen displayed on a digital device in response to a specific command a method of according to one embodiment of the present invention.

Referring to FIG. 11, according to one embodiment of the present invention, the controller 740 of the digital device 700 can control the communication unit 720 to connect a communication with a $1^{st}$ external device. The controller 740 can control the communication unit 720 to receive a play information of at least one content played in the $1^{st}$ external device and a setting data of the $1^{st}$ external device from the $1^{st}$ external device. And, the controller 180 can save the play information of the at least one content and the setting data of the $1^{st}$ external device, which are received from the $1^{st}$ external device, to the memory 710.

The play information, which is received from the $1^{st}$ external device, of the at least one content may include at least one of information on an application having each of the at least one content played thereon, a date having each of the at least one content played thereon, a time having each of the at least one content played thereon, a title of the at least one content, an image corresponding to each of the at least one content, and information on a timing point of ending a play of each of the at least one content.

The setting data of the $1^{st}$ external device 801, which is received from the $1^{st}$ external device, may include at least one of an audio setting information (e.g., a sound level, etc.) of the $1^{st}$ external device 801, a video setting information (e.g., a brightness, a contrast, etc.) of the $1^{st}$ external device 801, a channel setting information (e.g., information on a channel set as a preferred channel, information on a channel registered as a channel, etc.), a viewing reservation setting information, a recording reservation setting information, an alarm setting information, and a user information (e.g., a user account information, a user age, a user gender, a user's country, user's residence area, etc.). In particular, the setting data may be the data that includes the user information and the information on the setting values set in the $1^{st}$ external device 801 all.

Based on the play information of the at least one content received from the $1^{st}$ external device, the controller 740 can control the display unit 730 to display at least one indicator corresponding to each of the at least one content on a screen.

For instance, referring to FIG. 11 (*a*), when a $1^{st}$ program was played 12 PM to 1 PM in a $1^{st}$ external device and a $2^{nd}$ program was played 10 PM to 11 PM in the $1^{st}$ external device, the controller 740 can control the display unit 730 to display an indicator 901-1 including a $1^{st}$ information indicating that the $1^{st}$ program was played 12 PM to 1 PM and an indicator 901-2 including a $2^{nd}$ information indicating that the $2^{nd}$ program was played 10 PM to 11 PM on the screen.

In this case, the $1^{st}$ information may include at least one of information on a channel having the $1^{st}$ program broadcasted thereon, information on an application having the $1^{st}$ program played thereon, a date having the $1^{st}$ program played thereon, a time having the $1^{st}$ program played therein, a title of the $1^{st}$ program, an image corresponding to the $1^{st}$ program, and information on a timing point of ending a play of the $1^{st}$ program.

And, the $2^{nd}$ information may include at least one of information on a channel having the $2^{nd}$ program broadcasted thereon, information on an application having the $2^{nd}$ program played thereon, a date having the $2^{nd}$ program played thereon, a time having the $2^{nd}$ program played therein, a title of the $2^{nd}$ program, an image corresponding to the $2^{nd}$ program, and information on a timing point of ending a play of the $2^{nd}$ program.

Moreover, each of the $1^{st}$ information and the $2^{nd}$ information may include information on the $1^{st}$ external device.

Using the play information of the at least one content, the controller 740 can arrange at least one indicator corresponding to each of the at least one content on the screen in order of time in which each of the at least one content was played.

In particular, using the play information of the at least one content, the controller 740 controls the display unit 730 to display an indicator corresponding to a content played in the earliest time among the at least one or more contents on a most top end portion of the screen and also controls the display unit 730 to display an indicator corresponding to a content played behind the earliest played content below the former indicator displayed on the most top end portion of the screen.

For instance, when a $1^{st}$ program was played 12 PM to 1 PM in a $1^{st}$ external device and a $2^{nd}$ program was played 10 PM to 11 PM in the $1^{st}$ external device, the display unit 730 is controlled to display an indicator 901-1 corresponding to the $1^{st}$ program on a most top end portion of the screen and to display an indicator 901-2 corresponding to the $2^{nd}$ program by following the former indicator 901-2 in order.

According to an embodiment, using the play information of the at least one or more contents, the controller 740 may control the display unit 730 to display an indicator corresponding to a content played in the latest time among the at least one or more contents on a most top end portion of the screen.

The controller 740 controls the communication unit 720 to connect a communication with a $2^{nd}$ external device. Subsequently, in response to a command for selecting a $1^{st}$ indicator from the at least one or more indicators, the controller 740 is able to control the communication unit 720 to transmit a play signal for playing a specific content corresponding to the $1^{st}$ indicator and a play information of the specific content to the $2^{nd}$ external device. This shall be described in detail with reference to FIG. 19 later.

Meanwhile, based on the setting data of the $1^{st}$ external device, the controller 740 can control the display unit 730 to display a $2^{nd}$ indicator corresponding to a function of changing the settings of the $2^{nd}$ external device.

For instance, referring to FIG. 11 (*b*), in case of receiving a setting data corresponding to a change of a volume adjustment value from the $1^{st}$ external device at 3 PM, the controller 740 can control the display unit 730 to display a $2^{nd}$ indicator 902-1 including a $3^{rd}$ information indicating that the setting data of the $1^{st}$ external device was received at 3 PM. Meanwhile, in case of receiving a setting data corresponding to changes of a brightness value and a contrast value from the $1^{st}$ external device at 10 PM, the controller 740 can control the display unit 730 to display a $2^{nd}$ indicator 902-2 including a $4^{th}$ information indicating that the setting data of the $1^{st}$ external device was received together with the $2^{nd}$ indicator 902-1 including the $3^{rd}$ information.

Using the setting data of the $1^{st}$ external device, the controller 740 may arrange the at least one or more $2^{nd}$ indicators on the screen in order of a time in which the setting data was received. In particular, the controller 740 controls the display unit 730 to display a $2^{nd}$ indicator corresponding to a setting data received in the earliest time among the at least one or more $2^{nd}$ indicators on a most top end portion of the screen and also controls the display unit 730 to display a $2^{nd}$ indicator corresponding to a subsequently data (or, a previously received setting data) below the former $2^{nd}$ indicator displayed on the most top end portion of the screen.

Eventually, the controller 740 can control the display unit 730 to arrange the at least one or more indicators displayed on the screen in a manner that the at least one or more indicators are arranged in order of time.

Meanwhile, in response to a command for selecting a prescribed $2^{nd}$ indicator from the at least one or more $2^{nd}$ indicators, the controller 740 can control the communication unit 720 to transmit the setting data of the $1^{st}$ external device to the $2^{nd}$ external device. Based on the received setting data of the $1^{st}$ external device, the $2^{nd}$ external device can change the setting of the $2^{nd}$ external device. This will be described in detail with reference to FIG. 20 later.

Figure 12:
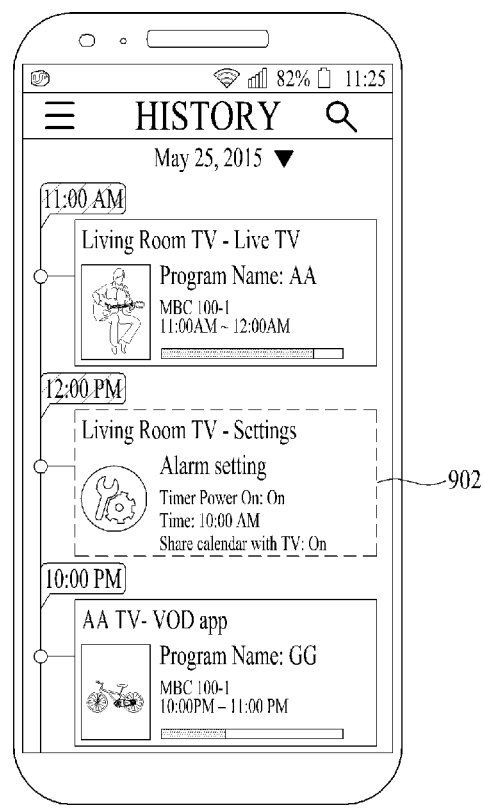
FIG. 12 is a diagram to describe other examples of a screen displayed on a digital device in response to a specific command a method of according to one embodiment of the present invention.

FIG. 12 is a diagram to describe other examples of a screen displayed on a digital device in response to a specific command a method of according to one embodiment of the present invention. Regarding the description with reference to FIG. 12, the contents redundant with the foregoing description with reference to FIG. 11 shall not be mentioned again and the following description shall be made centering on the differences.

Referring to FIG. 12, if a setting data indicating that an alarm was set in a $1^{st}$ external device is received on 12 PM from the $1^{st}$ external device, the controller 740 can control the display unit 730 to display a $2^{nd}$ indicator 902 including information indicating that the setting data was received on 12 PM.

In this case, the information may include information indicating whether the set alarm has been saved in a schedule, information on a time related to the set alarm, and the like.

Hence, a user can apply the same alarm as set in the $1^{st}$ external device to a $2^{nd}$ external device through a simple manipulation.

Figure 13:
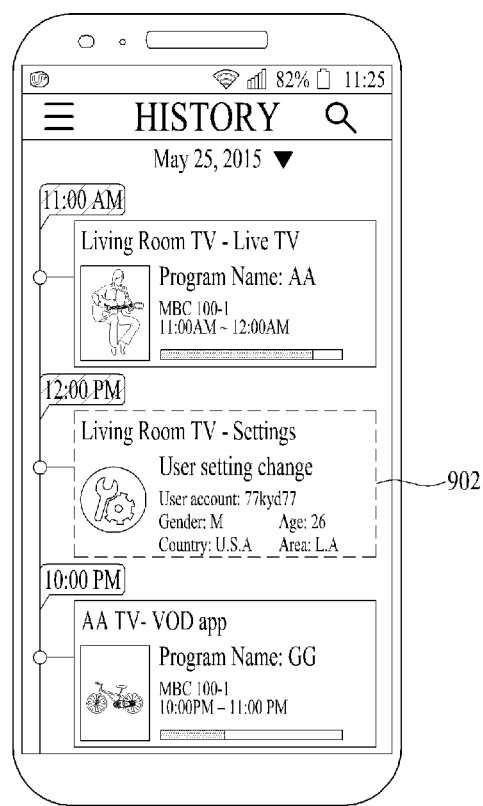
FIG. 13 is a diagram to describe other examples of a screen displayed on a digital device in response to a specific command a method of according to one embodiment of the present invention.

FIG. 13 is a diagram to describe other examples of a screen displayed on a digital device in response to a specific command a method of according to one embodiment of the present invention. Regarding the description with reference to FIG. 13, the contents redundant with the foregoing description with reference to FIG. 11 shall not be mentioned again and the following description shall be made centering on the differences.

Referring to FIG. 13, if a setting data indicating that a user information was changed in a $1^{st}$ external device is received on 12 PM, the controller 740 can control the display unit 730 to display a $2^{nd}$ indicator 902 including information indicating that the setting data was received on 12 PM.

In this case, the information may include a user account, a user's gender, a user's age, information on user's residence country, information on user's residence area, and the like.

Hence, a user can apply the same user information as set in the $1^{st}$ external device to a $2^{nd}$ external device through a simple manipulation.

Figure 14:
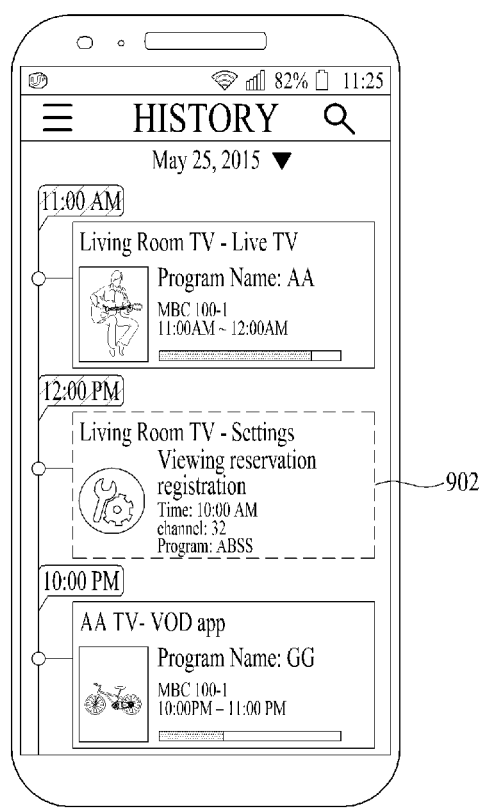
FIG. 14 is a diagram to describe other examples of a screen displayed on a digital device in response to a specific command a method of according to one embodiment of the present invention.

FIG. 14 is a diagram to describe other examples of a screen displayed on a digital device in response to a specific command a method of according to one embodiment of the present invention. Regarding the description with reference to FIG. 14, the contents redundant with the foregoing description with reference to FIG. 11 shall not be mentioned again and the following description shall be made centering on the differences.

Referring to FIG. 14, if a setting data indicating that a viewing reservation of a $1^{st}$ external device is set is received on 12 PM from the $1^{st}$ external device, the controller 740 can control the display unit 730 to display a $2^{nd}$ indicator 902 including information indicating that the setting data was received on 12 PM.

In this case, the information may include at least one of information on a viewing reservation set program, information on a viewing reservation set time, and information on a viewing reservation set channel.

Hence, a user can apply the same viewing reservation as set in the $1^{st}$ external device to a $2^{nd}$ external device through a simple manipulation.

Figure 15:
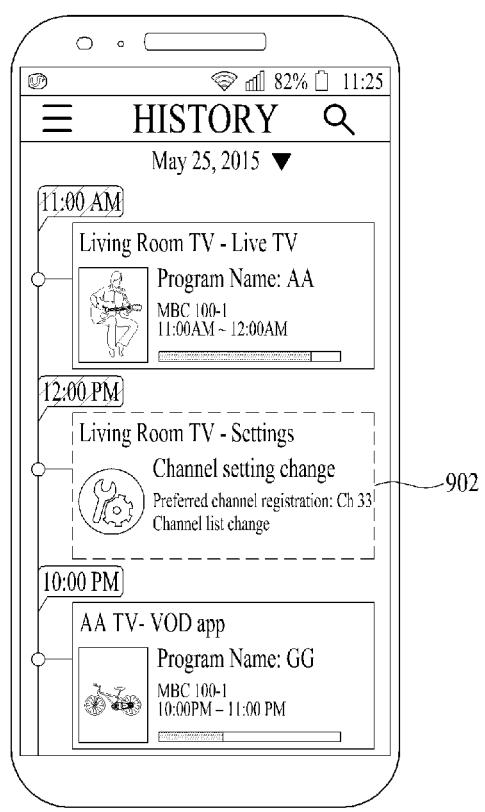
FIG. 15 is a diagram to describe other examples of a screen displayed on a digital device in response to a specific command a method of according to one embodiment of the present invention.

FIG. 15 is a diagram to describe other examples of a screen displayed on a digital device in response to a specific command a method of according to one embodiment of the present invention. Regarding the description with reference to FIG. 15, the contents redundant with the foregoing description with reference to FIG. 11 shall not be mentioned again and the following description shall be made centering on the differences.

Referring to FIG. 15, if a setting data indicating that a channel setting of a $1^{st}$ external device is changed is received on 12 PM from the $1^{st}$ external device, the controller 740 can control the display unit 730 to display a $2^{nd}$ indicator 902 including information indicating that the channel setting was received on 12 PM.

In this case, the information may include information on a changed channel.

Hence, a user can apply the same channel as changed in the $1^{st}$ external device to a $2^{nd}$ external device through a simple manipulation.

Meanwhile, according to one embodiment of the present invention, the controller 740 can rearrange at least one indicator displayed on the screen in accordance with a date, an application, a place, and/or the like. This is described in detail with reference to FIGS. 16 to 18 as follows.

Figure 16:
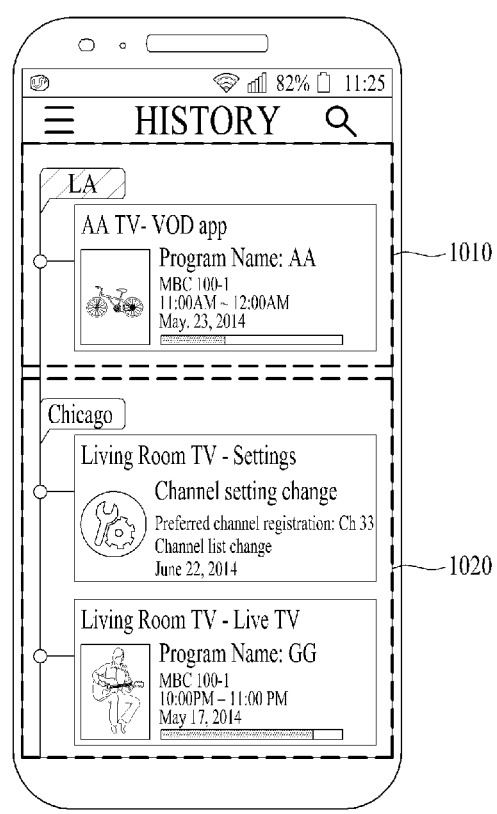
FIG. 16 is a diagram to describe one example of a method of arranging at least one indicator in accordance with a place in a digital device according to one embodiment of the present invention.

FIG. 16 is a diagram to describe one example of a method of arranging at least one indicator in accordance with a place in a digital device according to one embodiment of the present invention. Regarding the description with reference to FIG. 16, the contents redundant with the foregoing descriptions with reference to FIGS. 11 to 15 shall not be mentioned again and the following description shall be made centering on the differences.

Referring to FIG. 16, according to one embodiment of the present invention, the controller 740 of the digital device 700 can control the communication unit 720 to connect a communication with a $1^{st}$ external device. The controller 740 can control the communication unit 720 to receive a play information of at least one content played in the $1^{st}$ external device and a setting data of the $1^{st}$ external device from the $1^{st}$ external device. And, the controller 180 can save the play information of the at least one content and the setting data of the $1^{st}$ external device, which are received from the $1^{st}$ external device, to the memory 710.

Meanwhile, when the play information of the at least one content played in the $1^{st}$ external device and the setting data of the $1^{st}$ external device are saved to the memory 710, the controller 740 of the digital device 700 can save information on a place to the memory 710 as well.

For instance, when the play information of the at least one content played in the $1^{st}$ external device and the setting data of the $1^{st}$ external device are received from the $1^{st}$ external device, the controller 740 can receive the information on the place as well. In doing so, the information on the place may be saved in the $1^{st}$ external device.

For another instance, the location information module 315 shown in FIG. 3 may be included in the digital device 700.

Hence, when the play information of the at least one content played in the 1st external device and the setting data of the 1st external device are received from the 1st external device, the controller 740 can obtain the information on the place using the location information module 315. And, the controller 140 can save the information on the place to the memory 710 together with the play information of the at least one content played in the 1st external device and the setting data of the 1st external device.

The play information, which is received from the 1st external device, of the at least one content may include at least one of information on an application having each of the at least one content played thereon, a date having each of the at least one content played thereon, a time having each of the at least one content played thereon, a title of the at least one content, an image corresponding to each of the at least one content, and information on a timing point of ending a play of each of the at least one content.

The setting data of the 1st external device 801, which is received from the 1st external device, may include at least one of an audio setting information (e.g., a sound level, etc.) of the 1st external device 801, a video setting information (e.g., a brightness, a contrast, etc.) of the 1st external device 801, a channel setting information (e.g., information on a channel set as a preferred channel, information on a channel registered as a channel, etc.), a viewing reservation setting information, a recording reservation setting information, an alarm setting information, and a user information (e.g., a user account information, a user age, a user gender, user's country, user's residence area, etc.). In particular, the setting data may be the data that includes the user information and the information on the setting values set in the 1st external device 801 all.

Based on the play information of the at least one content received from the 1st external device, the controller 740 can control the display unit 730 to display at least one indicator corresponding to each of the at least one content and a 2nd indicator corresponding to the setting data of the 1st external device, which is received from the 1st external device, on a screen.

Referring to FIG. 16, in response to a specific command, the controller 740 can control the display unit 730 to rearrange the at least one or more indicators, which are displayed on the screen, on the screen using the information on the place.

In particular, in case of detecting a command for arranging an indicator in accordance with a place through a setting menu, the controller 740 can control the display unit 730 to rearrange the at least one indicator, which is displayed on the screen, on the screen.

For instance, in case of receiving a play information of a 1st program from an external device existing in a 1st place (e.g., LA) and also receiving a play information of a 2nd program and a setting data of an external device existing in a 2nd place (e.g., Chicago) from the external device existing in the 2nd place, the controller 740 can rearrange the at least one indicator displayed on the screen per place in response to the specific command. In particular, the controller 740 displays an indicator corresponding to the play information of the 1st program, which is received from the external device existing in the 1st place, on a region 1010 related to the 1st place and also displays an indicator corresponding to the play information of the 2nd program, which is received from the external device existing in the 2nd place, and an indicator corresponding to the setting data of the external device existing in the 2nd place on a region 1020 related to the 2nd place.

Meanwhile, according to one embodiment of the present invention, the controller 740 can rearrange at least one indicator displayed on the screen in accordance with an application. This is described in detail with reference to FIG. 17 as follows.

Figure 17:
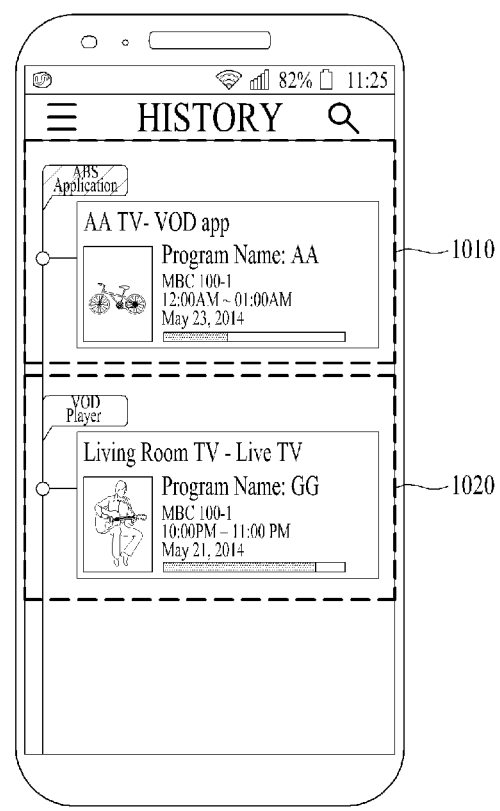
FIG. 17 is a diagram to describe one example of a method of arranging at least one indicator in accordance with an application in a digital device according to one embodiment of the present invention.

FIG. 17 is a diagram to describe one example of a method of arranging at least one indicator in accordance with an application in a digital device according to one embodiment of the present invention. Regarding the description with reference to FIG. 17, the contents redundant with the foregoing descriptions with reference to FIGS. 11 to 15 shall not be mentioned again and the following description shall be made centering on the differences.

Referring to FIG. 17, according to one embodiment of the present invention, the controller 740 of the digital device 700 can control the communication unit 720 to connect a communication with a 1st external device. The controller 740 can control the communication unit 720 to receive a play information of at least one content played in the 1st external device and a setting data of the 1st external device from the 1st external device. And, the controller 180 can save the play information of the at least one content and the setting data of the 1st external device, which are received from the 1st external device, to the memory 710.

The play information, which is received from the 1st external device, of the at least one content may include at least one of information on an application having each of the at least one content played thereon, a date having each of the at least one content played thereon, a time having each of the at least one content played thereon, a title of the at least one content, an image corresponding to each of the at least one content, and information on a timing point of ending a play of each of the at least one content.

The setting data of the 1st external device 801, which is received from the 1st external device, may include at least one of an audio setting information (e.g., a sound level, etc.) of the 1st external device 801, a video setting information (e.g., a brightness, a contrast, etc.) of the 1st external device 801, a channel setting information (e.g., information on a channel set as a preferred channel, information on a channel registered as a channel, etc.), a viewing reservation setting information, a recording reservation setting information, an alarm setting information, and a user information (e.g., a user account information, a user age, a user gender, user's country, user's residence area, etc.). In particular, the setting data may be the data that includes the user information and the information on the setting values set in the 1st external device 801 all.

Based on the play information of the at least one content received from the 1st external device, the controller 740 can control the display unit 730 to display at least one indicator corresponding to each of the at least one content and a 2nd indicator corresponding to the setting data of the 1st external device, which is received from the 1st external device, on a screen.

Referring to FIG. 17, in response to a specific command, the controller 740 can control the display unit 730 to rearrange the at least one or more indicators, which are displayed on the screen, on the screen using the information on the application having each of the at least one content played thereon.

For instance, in case of playing a 1st program on a 1st application of the 1st external device and also playing a 2nd program on a 2nd application of the 1st external device, the controller 740 can control the display unit 730 to display an indicator corresponding to the 1st program played on the 1st application on a region 1110 related to the 1st application and to display an indicator corresponding to the $2^{nd}$ program played on the $2^{nd}$ application on a region 1120 related to the $2^{nd}$ application.

Meanwhile, according to one embodiment of the present invention, the controller 740 can rearrange at least one indicator displayed on the screen in accordance with an application. This is described in detail with reference to FIG. 18 as follows.

Figure 18:
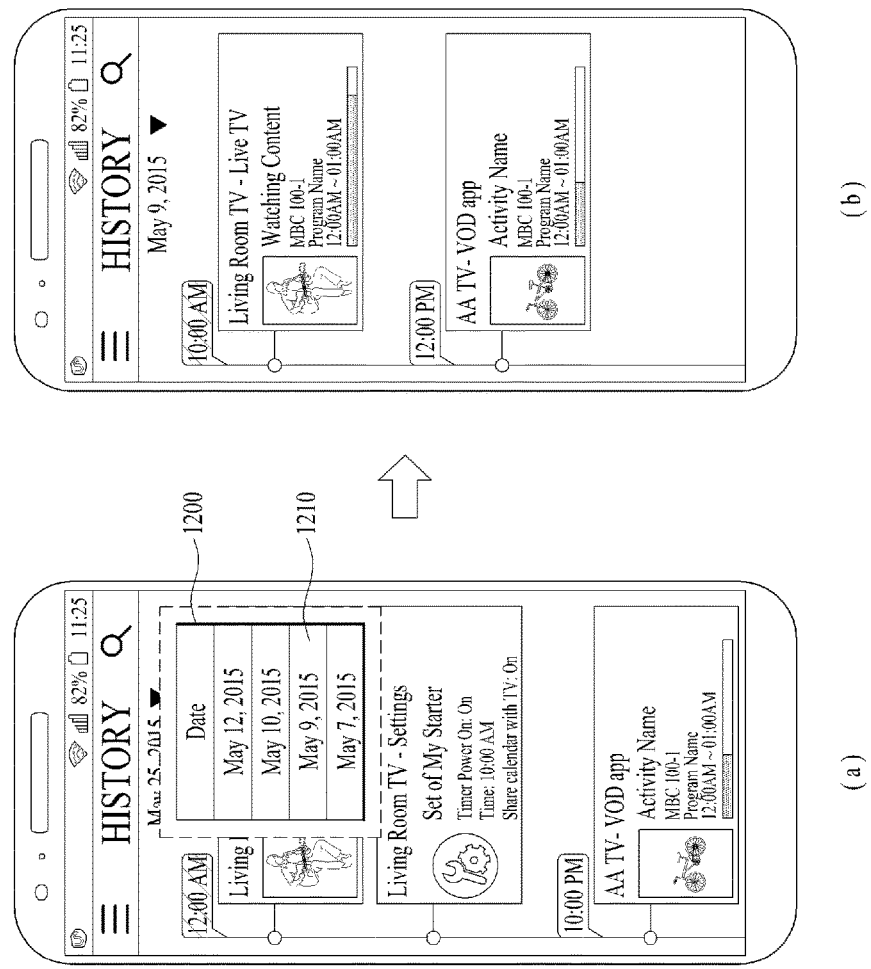
FIG. 18 is a diagram to describe one example of a method of arranging at least one indicator in accordance with a date in a digital device according to one embodiment of the present invention.

FIG. 18 is a diagram to describe one example of a method of arranging at least one indicator in accordance with a date in a digital device according to one embodiment of the present invention. Regarding the description with reference to FIG. 18, the contents redundant with the foregoing descriptions with reference to FIGS. 11 to 15 shall not be mentioned again and the following description shall be made centering on the differences.

Referring to FIG. 18, according to one embodiment of the present invention, the controller 740 of the digital device 700 can control the communication unit 720 to connect a communication with a $1^{st}$ external device. The controller 740 can control the communication unit 720 to receive a play information of at least one content played in the $1^{st}$ external device and a setting data of the $1^{st}$ external device from the $1^{st}$ external device. And, the controller 180 can save the play information of the at least one content and the setting data of the $1^{st}$ external device, which are received from the $1^{st}$ external device, to the memory 710.

The play information, which is received from the $1^{st}$ external device, of the at least one content may include at least one of information on an application having each of the at least one content played thereon, a date having each of the at least one content played thereon, a time having each of the at least one content played thereon, a title of the at least one content, an image corresponding to each of the at least one content, and information on a timing point of ending a play of each of the at least one content.

The setting data of the $1^{st}$ external device 801, which is received from the $1^{st}$ external device, may include at least one of an audio setting information (e.g., a sound level, etc.) of the $1^{st}$ external device 801, a video setting information (e.g., a brightness, a contrast, etc.) of the $1^{st}$ external device 801, a channel setting information (e.g., information on a channel set as a preferred channel, information on a channel registered as a channel, etc.), a viewing reservation setting information, a recording reservation setting information, an alarm setting information, and a user information (e.g., a user account information, a user age, a user gender, user's country, user's residence area, etc.). In particular, the setting data may be the data that includes the user information and the information on the setting values set in the $1^{st}$ external device 801 all.

Based on the play information of the at least one content received from the $1^{st}$ external device, the controller 740 can control the display unit 730 to display at least one indicator corresponding to each of the at least one content and a $2^{nd}$ indicator corresponding to the setting data of the $1^{st}$ external device, which is received from the $1^{st}$ external device, on a screen.

In response to a command for displaying a content played on a specific date, the controller 740 can control the display unit 730 to display at least one indicator, which was played on the specific date, on the screen using the play information of the at least one content.

For instance, referring to FIG. 18 (a), the command for playing the content played on the specific date may include a command of selecting a specific indicator 1200 displayed on the screen and then selecting the specific date from an outputted window 1210.

Referring to FIG. 18 (b), the controller 740 can control the display unit 730 to display at least one indicator, which corresponds to the at least one content played on the specific date selected from the window 1210 shown in FIG. 18 (a), on the screen. For instance, if a user selects May 9 from the window 1210 shown in FIG. 18 (a), the controller 740 can control the display unit 730 to display at least one indicator, which corresponds to the at least one content played on May 9 in the $1^{st}$ external device, on the screen.

Meanwhile, in response to a command for selecting a $1^{st}$ indicator from the at least one or more indicators, the controller 740 can control the communication unit 720 to transmit a play signal for playing a specific content corresponding to the $1^{st}$ indicator and a play information of the specific content to the $2^{nd}$ external device. This is described in detail with reference to FIG. 19 as follows.

FIG. 19 is a diagram to describe one example of a method for a digital device to transmit a play signal for playing a specific content and a play information of the specific content to a $2^{nd}$ external device according to one embodiment of the present invention.

Referring to FIG. 19, according to one embodiment of the present invention, the controller 740 of the digital device 700 can control the communication unit 720 to connect a communication with a $1^{st}$ external device. The controller 740 can control the communication unit 720 to receive a play information of at least one content played in the $1^{st}$ external device and a setting data of the $1^{st}$ external device from the $1^{st}$ external device. And, the controller 180 can save the play information of the at least one content and the setting data of the $1^{st}$ external device, which are received from the $1^{st}$ external device, to the memory 710.

The play information, which is received from the $1^{st}$ external device, of the at least one content may include at least one of information on an application having each of the at least one content played thereon, a date having each of the at least one content played thereon, a time having each of the at least one content played thereon, a title of the at least one content, an image corresponding to each of the at least one content, and information on a timing point of ending a play of each of the at least one content.

Based on the play information of the at least one content received from the $1^{st}$ external device, the controller 740 can control the display unit 730 to display at least one indicator corresponding to each of the at least one content and a $2^{nd}$ indicator corresponding to the setting data of the $1^{st}$ external device, which is received from the $1^{st}$ external device, on a screen.

For instance, referring to FIG. 19 (a), when a $1^{st}$ program was played 12 PM to 1 PM in a $1^{st}$ external device and a $2^{nd}$ program was played 10 PM to 11 PM in the $1^{st}$ external device, the controller 740 can control the display unit 730 to display a $1^{st}$ indicator 901-1 including a $1^{st}$ information indicating that the $1^{st}$ program was played 12 PM to 1 PM and a $2^{nd}$ indicator 901-2 including a $2^{nd}$ information indicating that the $2^{nd}$ program was played 10 PM to 11 PM on the screen.

Meanwhile, in response to a command for selecting the $1^{st}$ indicator 901-1 shown in FIG. 19 (a), the controller 740 can control the communication unit 720 to transmit a signal for playing a specific content corresponding to the $1^{st}$ indicator and a play information of the specific content to the $2^{nd}$ external device.

In particular, referring to FIG. 19 (b), in response to a command for selecting the $1^{st}$ indicator 901-1 shown in FIG. 19 (a), the controller 740 can control the display unit 730 to display information on an external device communication-connectible with a digital device. And, the controller 740 can control the communication unit 720 to transmit a signal for playing a specific content corresponding to the $1^{st}$ indicator 901-1 and a play information of the specific content to a $2^{nd}$ external device corresponding to information 1310 selected by a user from the displayed information. In this case, the play information of the specific content may include information on a timing point at which a play of the specific content corresponding to the $1^{st}$ indicator 901-1 is ended in the $1^{st}$ external device.

In case of receiving the control signal for playing the specific content corresponding to the $1^{st}$ indicator and the play information of the specific content, the $2^{nd}$ external device can play the specific content. In doing so, the $2^{nd}$ external device can control the specific content to be played after the timing point, at which the specific content stops being played in the $1^{st}$ external device, using the play information of the specific content. In particular, although a user uses different external devices, the user can watch the same content continuously.

Figure 20:
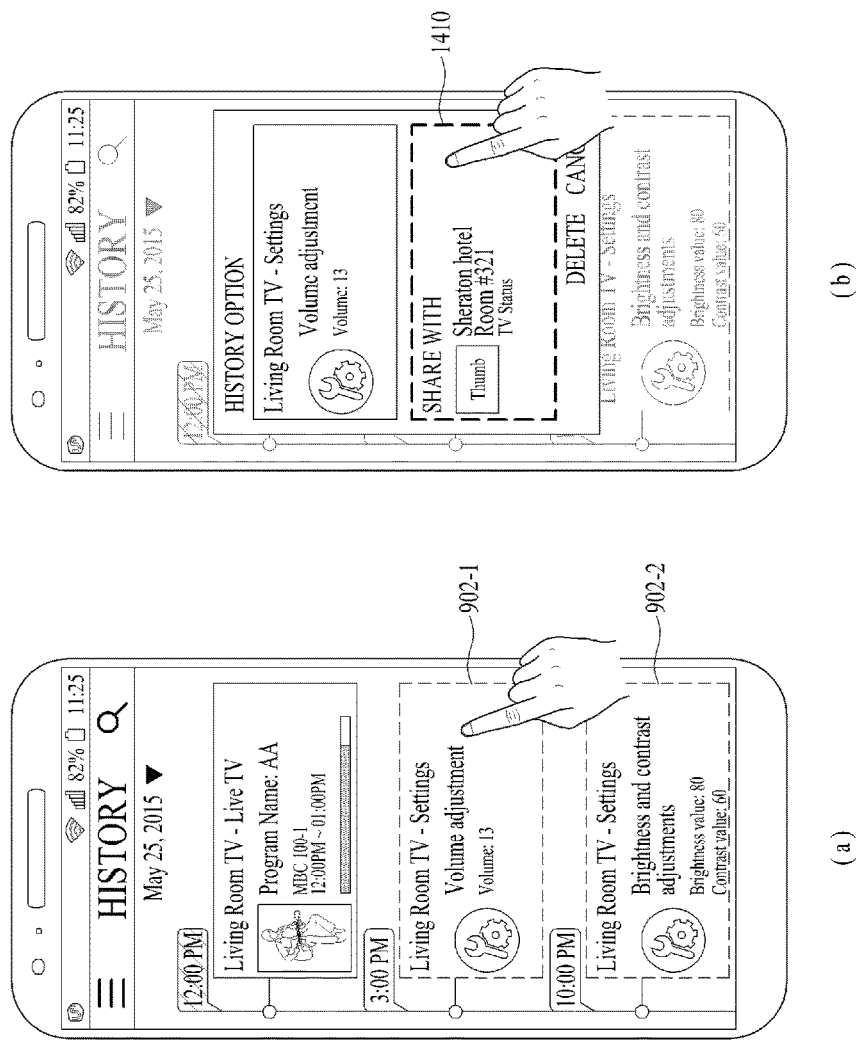
FIG. 20 is a diagram to describe one example of a method for a digital device to transmit a setting data of a $1^{st}$ external device to a $2^{nd}$ external device according to one embodiment of the present invention.

FIG. 20 is a diagram to describe one example of a method for a digital device to transmit a setting data of a $1^{st}$ external device to a $2^{nd}$ external device according to one embodiment of the present invention.

Referring to FIG. 20, according to one embodiment of the present invention, the controller 740 of the digital device 700 can control the communication unit 720 to connect a communication with a $1^{st}$ external device. The controller 740 can control the communication unit 720 to receive a play information of at least one content played in the $1^{st}$ external device and a setting data of the $1^{st}$ external device from the $1^{st}$ external device. And, the controller 180 can save the play information of the at least one content and the setting data of the $1^{st}$ external device, which are received from the $1^{st}$ external device, to the memory 710.

The setting data of the $1^{st}$ external device 801, which is received from the $1^{st}$ external device, may include at least one of an audio setting information (e.g., a sound level, etc.) of the $1^{st}$ external device 801, a video setting information (e.g., a brightness, a contrast, etc.) of the $1^{st}$ external device 801, a channel setting information (e.g., information on a channel set as a preferred channel, information on a channel registered as a channel, etc.), a viewing reservation setting information, a recording reservation setting information, an alarm setting information, and a user information (e.g., a user account information, a user age, a user gender, user's country, user's residence area, etc.). In particular, the setting data may be the data that includes the user information and the information on the setting values set in the $1^{st}$ external device 801 all.

Based on the setting data received from the $1^{st}$ external device, the controller 740 can control the display unit 730 to display a $2^{nd}$ indicator corresponding to a function for changing a setting of the $2^{nd}$ external device.

For instance, referring to FIG. 20 (a), in case of receiving a setting data corresponding to a change of a volume adjustment value from the $1^{st}$ external device at 3 PM, the controller 740 can control the display unit 730 to display a $1^{st}$ indicator 902-1 including a $1^{st}$ information indicating that the setting data of the $1^{st}$ external device was received at 3 PM. Meanwhile, in case of receiving a setting data corresponding to changes of a brightness value and a contrast value from the $1^{st}$ external device at 10 PM, the controller 740 can control the display unit 730 to display a $2^{nd}$ indicator 902-2 including a $2^{nd}$ information indicating that the setting data of the $1^{st}$ external device was received at 10 PM together with the $1^{st}$ indicator 902-1.

Meanwhile, in response to a command for selecting the $1^{st}$ indicator 902-1 shown in FIG. 20 (a), the controller 740 can control the communication unit 720 to transmit a setting data of the $1^{st}$ external device corresponding to the $1^{st}$ indicator to the $2^{nd}$ external device.

In particular, referring to FIG. 20 (b), in response to a command for selecting the $1^{st}$ indicator 902-1 shown in FIG. 20 (a), the controller 740 can control the display unit 730 to display information on an external device communication-connectible with a digital device. And, the controller 740 can control the communication unit 720 to transmit the setting data of the $1^{st}$ external device corresponding to the $1^{st}$ indicator 902-1 to a $2^{nd}$ external device corresponding to information 1410 selected by a user from the displayed information.

In case of receiving the setting data of the $1^{st}$ external device corresponding to the selected $1^{st}$ indicator 902-1, the $2^{nd}$ external device can change the settings of the $2^{nd}$ external device using the received setting data of the $1^{st}$ external device.

For instance, if the setting data of the $1^{st}$ external device corresponding to the selected $1^{st}$ indicator 902-1 is a setting data corresponding to a change of a volume adjustment value of the $1^{st}$ external device, the $2^{nd}$ external device can adjust a volume of the $2^{nd}$ external device to correspond to the change of the volume adjustment value of the $1^{st}$ external device.

According to at least one of embodiments of the present invention, although a user has watched a specific content up to a specific timing point through a $1^{st}$ TV, it is advantageous in that the user can conveniently watch the specific content in continuation with the specific timing point through a $2^{nd}$ TV other than the $1^{st}$ TV. According to at least one of embodiments of the present invention, it is advantageous in that a user does not need to memorize the setting values previously changed for the respective TVs by a user in order to change the settings of a plurality of TVs into the same. And, it is also advantageous in that the user can conveniently change the setting values for the respective TVs using a digital device.

The digital device disclosed in the present specification can be achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

The digital device operating method disclosed in the present specification can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet). Further, the recording medium readable by a processor is distributed to a computer system connected to a network, whereby codes readable by the processor by distribution can be saved and executed.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

The present invention relates to a digital device and a method for controlling the same. Therefore, the present invention has industrial applicability.

What is claimed is:

1. A digital device, comprising:
   a display unit;
   a communication unit connecting a communication with a $1^{st}$ external device, the communication unit receiving, from the $1^{st}$ external device, a play information of at least one content played in the $1^{st}$ external device;
   a memory storing the play information of the at least one content received from the $1^{st}$ external device; and
   a controller configured to:
   control the communication unit to connect a communication with a $2^{nd}$ external device,
   control the display unit to display at least one indicator corresponding to each of the at least one content on a screen based on the play information of the at least one content,
   control the communication unit to transmit, to the $2^{nd}$ external device, a control signal for playing a specific content corresponding to a $1^{st}$ indicator and a play information of the specific content in response to a $1^{st}$ command for selecting the $1^{st}$ indicator from the at least one indicator,
   control the communication unit to receive, from the $1^{st}$ external device, a setting data of the $1^{st}$ external device, and
   control the display unit to display, on the screen, a $2^{nd}$ indicator corresponding to a function of changing a setting of the $2^{nd}$ external device based on the received setting data,
   wherein the $2^{nd}$ indicator is configured to include information on the $2^{nd}$ external device, the $2^{nd}$ external device being communication-connectible with the digital device.

2. The digital device of claim 1, wherein the controller arranges the at least one indicator corresponding to the each of the at least one content on the screen in order of time having the each of the at least one content played therein using the play information of the at least one content.

3. The digital device of claim 1, wherein in response to a $2^{nd}$ command for displaying a content played on a specific date, the controller controls the display unit to display the at least one content played on the specific date on the screen using the play information of the at least one content.

4. The digital device of claim 1, wherein in response to a $4^{th}$ command for selecting the $2^{nd}$ indicator, the controller controls the communication unit to transmit, to the $2^{nd}$ external device, a control signal for changing the setting of the $2^{nd}$ external device based on the setting data received from the $1^{st}$ external device.

5. A method of controlling a digital device, comprising:
   connecting a communication with a $1^{st}$ external device;
   receiving, from the $1^{st}$ external device, a play information of at least one content played in the $1^{st}$ external device;
   saving the play information of the at least one content received from the $1^{st}$ external device;
   connecting a communication with a $2^{nd}$ external device;
   displaying, on a screen, at least one indicator corresponding to each of the at least one content based on the play information of the at least one content;
   transmitting, to the $2^{nd}$ external device, a control signal for playing a specific content corresponding to a $1^{st}$ indicator and a play information of the specific content in response to a $1^{st}$ command for selecting the $1^{st}$ indicator from the at least one indicator;
   receiving, from the $1^{st}$ external device, a setting data of the $1^{st}$ external device; and
   displaying, on the screen, a $2^{nd}$ indicator corresponding to a function of changing a setting of the $2^{nd}$ external device based on the received setting data,
   wherein the $2^{nd}$ indicator is configured to include information on the $2^{nd}$ external device, the $2^{nd}$ external device being communication-connectible with the digital device.

6. The method of claim 5, wherein displaying, on the screen, the at least one indicator corresponding to the each of the at least one content based on the play information of the at least one content, comprises arranging the at least one indicator corresponding to the each of the at least one content on the screen in order of time having the each of the at least one content played therein using the play information of the at least one content.

7. The method of claim 5, wherein displaying, on the screen, the at least one indicator corresponding to the each of the at least one content on the screen based on the play information of the at least one content, comprises in response to a $2^{nd}$ command for displaying a content played on a specific date, displaying the at least one content played on the specific date on the screen using the play information of the at least one content.

8. The method of claim 5, further comprising in response to a $4^{th}$ command for selecting the $2^{nd}$ indicator, transmitting, to the $2^{nd}$ external device, a control signal for changing the setting of the $2^{nd}$ external device based on the setting data received from the $1^{st}$ external device.

* * * * *